United States Patent
Ryu et al.

(10) Patent No.: US 10,531,258 B2
(45) Date of Patent: Jan. 7, 2020

(54) LOCATION DETECTION APPARATUS AND METHOD IN COMMUNICATION SYSTEM SUPPORTING DEVICE-TO-DEVICE SCHEME

(71) Applicant: Samsung Electronics Co., Ltd., Suwon-si, Gyeonggi-do (KR)

(72) Inventors: Hyun-Seok Ryu, Yongin-si (KR); Anil Agiwal, Suwon-si (KR); Jeong-Ho Park, Seoul (KR); Won-Jun Hwang, Suwon-si (KR); Kyung-Kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/999,822

(22) PCT Filed: Feb. 14, 2017

(86) PCT No.: PCT/KR2017/001597
§ 371 (c)(1),
(2) Date: Aug. 20, 2018

(87) PCT Pub. No.: WO2017/142285
PCT Pub. Date: Aug. 24, 2017

(65) Prior Publication Data
US 2019/0246253 A1 Aug. 8, 2019

(30) Foreign Application Priority Data

Feb. 19, 2016 (KR) .................. 10-2016-0019675

(51) Int. Cl.
*H04W 4/70* (2018.01)
*H04W 8/00* (2009.01)
(Continued)

(52) U.S. Cl.
CPC ............... *H04W 4/70* (2018.02); *H04W 4/90* (2018.02); *H04W 8/005* (2013.01); *H04W 64/003* (2013.01); *H04W 68/005* (2013.01)

(58) Field of Classification Search
CPC ....... H04W 4/70; H04W 64/003; H04W 4/90; H04W 8/005; H04W 68/005
See application file for complete search history.

(56) References Cited

U.S. PATENT DOCUMENTS

2014/0194115 A1* 7/2014 Yang ................. H04W 52/0219
455/426.1
2014/0341132 A1 11/2014 Kim et al.
(Continued)

FOREIGN PATENT DOCUMENTS

JP 2005-223436 A 8/2005
KR 10-2014-0135656 A 11/2014
(Continued)

OTHER PUBLICATIONS

Alexander Pyattaev et al., 3GPP LTE-Assisted Wi-Fi-Direct: Trial Implementation of Live D2D Technology, ETRI Journal, vol. 37, No. 5, pp. 877-887, Oct. 1, 2015.

*Primary Examiner* — Curtis A Alia
(74) *Attorney, Agent, or Firm* — Jefferson IP Law, LLP

(57) ABSTRACT

The present invention relates not only to a fourth-generation (4G) communication system, such as long-term evolution (LTE), but also to a fifth-generation (5G) or pre-5G communication system to be provided to support a higher data transfer rate. The present invention provides a method for a first device in a communication system supporting a device-to-device (D2D) scheme, the method comprising the steps of: when existence of a second D2D device, of which the location information needs to be detected, has been detected, transmitting a discovery request message which requests activation of at least one of an urgent discovery operation (Continued)

and a location measurement operation; receiving a discovery response message to the discovery request message from at least one device including the second device; and transmitting, to the second device, information related to execution of the location measurement operation.

15 Claims, 16 Drawing Sheets

(51) Int. Cl.
*H04W 4/90* (2018.01)
*H04W 64/00* (2009.01)
*H04W 68/00* (2009.01)

(56) References Cited

U.S. PATENT DOCUMENTS

| | | | |
|---|---|---|---|
| 2015/0288726 A1 | 10/2015 | Smith | |
| 2015/0289127 A1* | 10/2015 | Ou | H04W 8/005 455/426.1 |
| 2017/0078863 A1 | 3/2017 | Kim et al. | |
| 2017/0150330 A1 | 5/2017 | Kim et al. | |

FOREIGN PATENT DOCUMENTS

| | | |
|---|---|---|
| KR | 10-2015-0008940 A | 1/2015 |
| WO | 2015/133816 A1 | 9/2015 |
| WO | 2015/160158 A1 | 10/2015 |

\* cited by examiner

: REFERENCE D2D DEVICE   . TARGET D2D DEVICE

LOCATION DETECTION APPARATUS AND METHOD IN COMMUNICATION SYSTEM SUPPORTING DEVICE-TO-DEVICE SCHEME

TECHNICAL FIELD

The present disclosure relates to an apparatus and method for detecting a location in a communication system supporting a device-to-device (D2D) scheme.

BACKGROUND ART

To satisfy demands for wireless data traffic which have been increasing since the commercialization of a 4th-generation (4G) communication system, efforts have been made to develop an advanced 5th-generation (5G) or pre-5G communication system. For this reason, the 5G or pre-5G communication system is called a beyond 4G network communication system or post long-term evolution (LTE) system.

To achieve high data rates, implementation of the 5G communication system in an ultra-high band (mmWave band) (e.g., a frequency band such as a 60-GHz band) is under consideration. Beamforming, massive multi-input multi-output (massive MIMO), full dimensional MIMO (FD-MIMO), array antennas, analog beamforming, large-scale antennas have been discussed for the 5G communication system in order to mitigate the pathloss of waves and increase the propagation distance of waves in the ultra-high frequency band.

In addition, evolved small cell, advanced small cell, cloud radio access network (cloud RAN), ultra-dense network, device-to-device (D2D) communication, coordinated multi-points (CoMP), interference cancellation, etc. have been developed in the 5G communication system, for the purpose of improving a network in the system.

Besides, hybrid frequency shift keying (FSK) and quadrature amplitude modulation (QAM) (hybrid FSK and QAM (FQAM)), and sliding window superposition coding (SWSC), which are advanced coding modulation (ACM) schemes, and filter bank multi carrier (FBMC), non-orthogonal multiple access (NOMA), and sparse code multiple access (SCMA), which are advanced access techniques, are under development in the 5G communication system.

In view of mobility and portability inherent to portable phones, location-based service (LBS) has been considered to be one of killer applications since the beginning of mobile communication.

Particularly, the drastic growth of smartphones has strengthened the current status of the LBS as a killer application. For example, iPhones and Android phones have defined the LBS as a killer application and have formed the basis of LBS activation by supporting hardware in the global positioning system (GPS) and wireless local area networks (WLANs), and providing various techniques and databases (DBs) for the LBS.

For example, iPhone operating system (iOS)-based smartphones and Android operating system (OS)-based smartphones detect locations based on cellular base stations (BSs), and provide various LBSs based on the detected locations.

As described above, iOS-based smartphones and OS-based smartphones provide a variety of LBSs, and there are various positioning precision requirements for the LBSs.

Table 1 below lists LBSs provided by various organizations and positioning precision requirements to support the LBSs.

TABLE 1

| Service classification | | Description | Requirements | Source |
| --- | --- | --- | --- | --- |
| Public safety and rescue service | Indoor | E911 Call | ~50 m (horizontal) ~30 m (vertical) | FCC ['15, February] |
| | Outdoor | Missing person/survivor positioning | 10~50 m | ETRI ['06, March] |
| Commercial service | Indoor | Advertisement transmission in shopping mall | ~0.5 m | METIS 2020 ['13, April] |
| | Outdoor | Ambient information (e.g., store) search | 75~125 m | ETRI ['06, March] |
| | | Navigation | 10~50 m | |
| Vehicle communication | | Collision prevention/ automatic driving | ~0.5 m | METIS 2020 ['13, April] |

As illustrated in Table 1, high-precision positioning may be needed to satisfy various positioning precision requirements. It may be difficult to perform such high-precision positioning by GPS-based positioning, WiFi-based positioning, and BS-based positioning, which will be described below in detail.

First, although GPS-based positioning may achieve a relatively high precision, for example, below an error of 5 m, at least three satellite signals are required to achieve this high precision. However, since signals from satellites are blocked in an urban region populated with a large number of buildings such as a dense urban environment, and an indoor environment, GPS-based positioning is not viable in the urban region and the indoor environment.

Secondly, a precision error, for example, below 5 m may be achieved in the indoor environment by WiFi-based positioning. However, it is impossible to use WiFi-based positioning for an LBS such as indoor navigation listed in Table 1 with the current precision. Moreover, WiFi-based positioning is not viable in an outdoor environment in which a WiFi access point (AP) is not installed.

Thirdly, BS-based positioning may not be preferred due to its error of tens of meters to a few kilometers.

As such, GPS-based positioning, WiFi-based positioning, and BS-based positioning have limitations in positioning precision and use environment. Accordingly, there is a need for an additional positioning scheme to provide various LBSs.

Further, Table 2 lists various applications which provide LBSs by GPS-based positioning, WiFi-based positioning, and BS-based positioning. The applications as listed in Table 2 below may be used very conveniently for the purpose of detecting the location of a device or the location of its correspondent device.

TABLE 2

| Category | | Application |
| --- | --- | --- |
| Location detection for device itself | Navigation | T-Map, KT olleh Navi, U+Navi, National Navigation Driver Kim, etc. |
| | Driving | Real-time guide of accident/construction sites: expressway guide, etc. Search for nearby bus stops/gas stations/ |

TABLE 2-continued

| Category | Application |
| --- | --- |
| | parking lots: Seoul Bus, Parking Park, Offinet, etc. |
| | Notify arrival at destination: Metro Wizard, Smarter Subway, etc. |
| Exercise assistance | Measure movement path/speed/exercise amount: Nike+GPS, bikemate, Run-GPS, Mobitee golf, etc. |
| Public safety | Reporter identification/positioning: One-Touch SOS Public Relief Service, etc. |
| Travel | Recommend sightseeing places/travel sites/travel course, and navigate: Korea Guseokguseok, Wishbeen, etc. |
| Location detection for correspondent device | MeWe, Famy, Life360, iSharing, etc. |

However, the applications as listed in Table 2 require a user's direct activation of a corresponding function, that is, a positioning function.

For example, to receive the LBS, the user activates a GPS function, a WiFi function, and a Bluetooth function, or directly executes a corresponding application so that the application activates the GPS function, the WiFi function, and the Bluetooth function.

Therefore, various applications which provide LBSs by GPS-based positioning, WiFi-based positioning, and BS-based positioning as listed in Table 2 may not be viable in an emergency situation such as a natural disaster like earthquake or tsunami, or a human-caused disaster such as a fire or poor construction, which results in building collapse and burial of persons. This is because a buried person may be placed in a situation in which it is difficult to activate a corresponding function. In addition, even though the corresponding function is activated, infrastructure in the surroundings may be destroyed in such an emergency situation as building collapse, making WiFi-based positioning impossible. Since the buried person is indoors, GPS-based positioning may be impossible.

Meanwhile, the above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the disclosure proposes an apparatus and method for detecting a location in a communication system supporting a D2D scheme.

Further, an embodiment of the disclosure proposes an apparatus and method for automatically detecting a location in a communication system supporting a D2D scheme.

Further, an embodiment of the disclosure proposes an apparatus and method for automatically activating a positioning function in a communication system supporting a D2D scheme.

Technical Solution

According to an embodiment of the disclosure, a method of a first device in a communication system supporting a device-to-device (D2D) scheme includes: upon detection of the presence of a second device being a device about which location information needs to be detected, transmitting a discovery request message requesting activation of at least one of an urgent discovery operation or a positioning operation; receiving a discovery response message to the discovery request message from at least one device including the second device; and transmitting information related to performing of the positioning operation to the second device.

According to an embodiment of the disclosure, a method of a first device in a communication system supporting a D2D scheme includes: receiving a discovery request message including an application code for activating a positioning operation, and an ID of a corresponding device; determining the corresponding device to be a second device being a device about which location information needs to be detected, and transmitting a discovery response message including a predetermined specific ID; and receiving, from the second device, information related to performing of the positioning operation by the second device.

According to an embodiment of the disclosure, a method of a second device in a communication system supporting a D2D scheme includes: receiving, from a first device, a discovery request message requesting at least one of an urgent discovery operation or a positioning operation; transmitting a discovery response message to the discovery request message to the first device; and receiving information related to performing of the positioning operation from the first device. Herein, the second device is a device about which location information needs to be detected.

According to an embodiment of the disclosure, a method of a second device in a communication system supporting a D2D scheme includes: transmitting a discovery request message including an application code for activating a positioning operation, and an ID of a corresponding device; receiving a discovery response message including a predetermined specific ID from the first device; and transmitting, to the first device, information related to performing of the positioning operation by the second device. Herein, the second device is a device about which location information needs to be detected.

According to an embodiment of the disclosure, a first device in a communication system supporting a D2D scheme includes: a controller configured to detect the presence of a second device being a device about which location information needs to be detected; a transmitter configured to transmit a discovery request message requesting activation of at least one of an urgent discovery operation or a positioning operation; and a receiver configured to receive a discovery response message to the discovery request message from at least one device including the second device. The transmitter is configured to transmit information related to performing of the positioning operation to the second device.

According to an embodiment of the disclosure, a first device in a communication system supporting a D2D scheme includes: a receiver configured to receive a discovery request message including an application code for activating a positioning operation, and an ID of a corresponding device; a controller configured to determine the corresponding device to be a second device being a device about which location information needs to be detected; and a transmitter configured to transmit a discovery response message including a predetermined specific ID. The receiver is configured to receive, from the second device, information related to performing of the positioning operation by the second device.

According to an embodiment of the disclosure, a second device in a communication system supporting a D2D scheme includes: a receiver configured to receive, from a first device, a discovery request message requesting at least one of an urgent discovery operation or a positioning operation; and a transmitter configured to transmit a discovery response message to the discovery request message to the first device. The receiver is configured to receive information related to performing of the positioning operation from the first device, and the second device is a device about which location information needs to be detected.

According to an embodiment of the disclosure, a second device in a communication system supporting a D2D scheme includes: a transmitter configured to transmit a discovery request message including an application code for activating a positioning operation, and an ID of a corresponding device; and a receiver configured to receive a discovery response message including a predetermined specific ID from the first device. The transmitter is configured to transmit, to the first device, information related to performing of the positioning operation by the second device, and the second device is a device about which location information needs to be detected.

Other aspects, advantages, and essential features of the present disclosure will become apparent to those skilled in the art from the following detailed description of preferred embodiments of the present disclosure taken in conjunction with the attached drawings.

Before undertaking the Mode for Carrying Out the Invention below, it may be advantageous to set forth definitions of certain words and phrases used throughout this patent document: the terms "include" and "comprise", as well as derivatives thereof, mean inclusion without limitation; the term "or" is inclusive, meaning "and/or"; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

Advantageous Effects

An embodiment of the disclosure enables location detection in a communication system supporting a D2D scheme.

Further, an embodiment of the disclosure enables automatic location detection in a communication system supporting a D2D scheme.

Further, an embodiment of the disclosure enables automatic activation of a positioning function in a communication system supporting a D2D scheme.

BRIEF DESCRIPTION OF DRAWINGS

The above and other aspects, features and advantages of certain preferred embodiments of the present disclosure will be more apparent from the following description taken in conjunction with the accompanying drawings. In the drawings.

Throughout the drawings, like reference numerals will be understood to refer to like or similar components, features, and structures.

MODE FOR CARRYING OUT THE INVENTION

Figure 1:
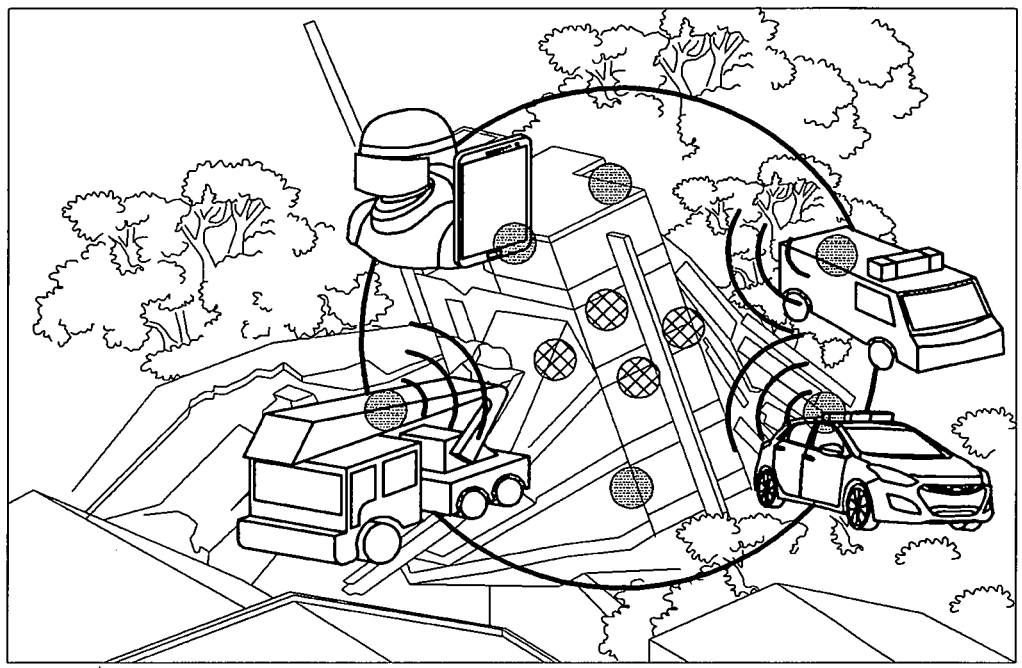
FIG. 1 is a schematic view illustrating an exemplary scenario of automatically detecting the location of a target D2D device in a communication system supporting a D2D scheme according to an embodiment of the disclosure.
Figure 1:
Figure 1:

The following detailed description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following detailed description and claims are not limited to the bibliographical meanings, but, are merely used by the inventor to enable a clear and consistent understanding of the disclosure. Accordingly, it should be apparent to those skilled in the art that the following detailed description of various embodiments of the disclosure is provided for illustrative purpose only and not for the purpose of limiting the disclosure as defined by the appended claims and their equivalents.

Further, it is to be understood that the singular forms "a," "an," and "the" include plural referents unless the context clearly dictates otherwise. Thus, for example, reference to "a component surface" includes reference to one or more of such surfaces.

Further, terms including an ordinal number such as "$1^{st}$", "$2^{nd}$", "first" or "second' may be used for the names of various components, not limiting the components. These expressions are used to distinguish one component from another component. For example, a first component may be referred to as a second component and vice versa without departing the scope of the disclosure. The term, and/or covers a combination of a plurality of related enumerated items or any of the plurality of related enumerated items.

Further, the terms as used in the disclosure are used simply to describe certain embodiments, not meant to limit the disclosure. Singular forms include plural referents unless the context clearly dictates otherwise. In the disclosure, the term "have", "may have", "include", or "may include" signifies the presence or possible addition of a feature, number, step, operation, component, or part, or a combination thereof, not excluding the presence or possible addition of one or more other features, numbers, steps, operations, components, or parts, or a combination thereof.

Unless otherwise defined, the terms including technical or scientific terms used in the disclosure may have the same meanings as generally understood by those skilled in the art. The terms as generally defined in dictionaries may be interpreted as having the same or similar meanings as or to contextual meanings of related technology.

According to various embodiments of the disclosure, an electronic device may have a communication function. For example, an electronic device may be a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical equipment, a camera, or a wearable device (e.g., a head-mounted device (HMD), electronic clothes, an electronic bracelet, an electronic necklace, an electronic appcessory, an electronic tattoo, a smart watch, or the like.

According to various embodiments of the disclosure, an electronic device may be a smart home appliance equipped with a communication function. For example, the smart home appliance may be a television, a digital versatile disk (DVD) player, an audio player, a refrigerator, an air conditioner, a vacuum cleaner, an oven, a microwave oven, a washer, a driver, an air purifier, a set-top box, a TV box (e.g., Samsung HomeSync™, Apple TV™, or Google TV™), a game console, an electronic dictionary, a camcorder, or an electronic picture frame.

According to various embodiments of the disclosure, an electronic device may be a medical device (e.g., a magnetic resonance angiography (MRA) device or a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., a naval navigation device, a gyroscope, or a compass), an avionic electronic device, a security device, or an industrial or consumer robot.

According to various embodiments of the disclosure, an electronic device may be furniture, part of a building/structure, an electronic board, an electronic signature receiving device, a projector, or various measuring devices (e.g., a water, electricity, gas or electro-magnetic wave measuring device), which have a communication device.

According to various embodiments of the disclosure, an electronic device may be a combination of two or more of the foregoing devices. Further, it will be apparent to those skilled in the art that an electronic device according to preferred embodiments of the disclosure is not limited to the foregoing devices.

According to various embodiments of the disclosure, a signal transmission apparatus or a signal reception apparatus may be, for example, a device. Further, according to various embodiments of the disclosure, a device may be interchangeably used with the term, user equipment (UE), terminal, wireless communication terminal, mobile station (MS), wireless terminal, mobile device, or the like.

According to various embodiments of the disclosure, a signal transmission apparatus or a signal reception apparatus may be, for example, a base station (BS). Further, according to various embodiments of the disclosure, a BS may be interchangeably used with the term, evolved node B (eNB), access point (AP), or the like.

An embodiment of the disclosure proposes an apparatus and method for detecting a location in a communication system supporting a device-to-device (D2D) scheme.

Further, an embodiment of the disclosure proposes an apparatus and method for automatically detecting a location in a communication system supporting a D2D scheme.

Further, an embodiment of the disclosure proposes an apparatus and method for automatically activating a positioning function in a communication system supporting a D2D scheme.

Meanwhile, the apparatus and method proposed in an embodiment of the disclosure is applicable to various communication systems such as a long-term evolution (LTE) mobile communication system, a long-term evolution-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a $3^{rd}$ generation partnership project 2 (3GPP2) high rate packet data (HRPD) mobile communication system, a 3GPP2 wideband code division multiple access (WCDMA) mobile communication system, a 3GPP2 code division multiple access (CDMA) mobile communication system, an institute of electrical and electronics engineers (IEEE) 802.16 communication system, an IEEE 802.16e communication system, an evolved packet system (EPS), a mobile Internet protocol (Mobile IP) system, mobile broadcasting service such as digital multimedia broadcasting (DMB) service, digital video broadcasting-handheld (DVP-H), and advanced television systems committee-mobile/handheld (ATSC-M/H) service, a digital video broadcasting system such as Internet protocol television (IPTV) service, and a moving picture experts group (MPEG) media transport (MMT) system.

First, LTE-based D2D schemes may be classified into a D2D direct discovery scheme and a D2D direct communication scheme.

The D2D direct discovery scheme is a scheme in which a device identifies the identities or interests of other devices existing within a short range from the device, or announces its identity or interest to other devices existing within a short range from the device. An identity and interest may be a device identifier (ID), an application ID, or a service ID, and may be configured in various manners according to a D2D service and a D2D service operation scenario.

Meanwhile, it is assumed in an embodiment of the present disclosure that the layer structure of a device includes a D2D application layer, a D2D management layer, and a D2D transmission layer.

The D2D application layer represents a D2D service application program executed on an operating system (OS) of the device. The D2D management layer converts discovery information generated in the D2D application program to a format suitable for the D2D transmission layer. The D2D transmission layer represents the physical (PHY) layer and medium access control (MAC) layer of the LTE communication system.

The D2D direct discovery scheme may include the following procedures under the above layer structure of the device.

Once the D2D application program is executed in a transmission device, the D2D application layer generates discovery information for D2D direct discovery, and transmits the discovery information to the D2D management layer. The D2D management layer converts the discovery information received from the D2D application program to a D2D management layer message suitable for the D2D transmission layer. The D2D management layer transmits the D2D management layer message to the D2D transmission layer, and the D2D transmission layer transmits D2D management layer message. Meanwhile, upon receipt of the D2D management layer message, reception devices perform a reception operation in a reverse order to the transmission operation performed in the transmission device.

Meanwhile, the D2D direct communication scheme is a communication scheme in which traffic is transmitted and received directly between devices without intervention of infrastructure such as a BS or an AP. In the D2D direct communication scheme, after a discovery operation, a device may perform a communication operation based on a discovery result, that is, the device may communicate with discovered devices, or communication may be conducted between devices without the discovery operation. In the D2D direct communication scheme, whether the discovery operation is to be performed before communication between devices may depend on a D2D service and a D2D operation scenario.

Meanwhile, D2D services may be classified into commercial service and public safety service. The commercial service may be called non-public safety service.

The commercial service may include, for example, advertisement, social network service (SNS), gaming, and so on, while the public safety service may include public safety and disaster network service, and so on. The advertisement, SNS, gaming, and public safety and disaster network service will be described below.

1) Advertisement

An operator of a communication network supporting a D2D scheme may allow D2D devices installed in pre-registered stores, cafes, movie theaters, restaurants, and so on to advertise their identifies to other D2D devices within a short range from the D2D devices by D2D direct discovery or D2D direct communication. Herein, an interest may be a promotion, event information, a discount coupon, or the like of an advertiser.

Meanwhile, if the identity of a D2D device installed in such a store, cafe, movie theater, restaurant, or the like matches to an interest of another D2D device, the other D2D device may acquire more information over a legacy communication network or by D2D direct communication by visiting the store, café, movie theater, restaurant, or the like.

In another example, a D2D device may discover another D2D device installed in a taxi near to the D2D device by D2D direct discovery, and transmit and receive data about its destination or charge information to and from the D2D device installed in the discovered taxi by legacy cellular communication or D2D direct communication.

2) SNS

A D2D device may transmit its application and an interest of the application to other D2D devices in a nearby area. An identity or interest used in D2D direct discovery may be a friend list provided by the application or an application ID of the application. After a D2D direct discovery operation, the D2D device may share content such as a picture or video preserved by the D2D device with D2D devices in a nearby area by D2D direct communication.

3) Gaming

To enjoy a mobile game with other users near to a user, the user may discover devices and a game application by D2D direct discovery, and perform D2D direct communication to transmit and receive data required for the game.

4) Public Safety and Disaster Network Service

A police officer, firefighter, or the like may use a D2D scheme for the purpose of public safety. That is, if a legacy cellular network is partially damaged due to an emergency situation such as a fire or a landslide, or a natural disaster such as earthquake, volcano, or tsunami, thus making cellular communication impossible, the police officer, firefighter, or the like may discover a nearby colleague or share emergency information with nearby users by the D2D scheme.

Meanwhile, an iPhone operating system (iOS)-based smartphone and an Android OS-based smartphone perform positioning in various positioning schemes, for example, by global positioning system (GPS)-based positioning, WiFi-based positioning, and cellular BS-based positioning, and provide various LBSs based on positioning results. GPS-based positioning, WiFi-based positioning, and cellular BS-based positioning will be described below.

(1) GPS-Based Positioning

GPS-based positioning schemes include a stand-alone GPS-based positioning scheme and a network-assisted GPS-based positioning scheme.

First, in the stand-alone GPS-based positioning scheme, a positioning operation is performed using only satellites, and triangulation is performed by detecting a plurality of satellites, for example, three or more satellites. Accordingly, in order to use the stand-alone GPS-based positioning scheme, a device should receive signals from the plurality of satellites, and calculate location coordinates from the received signals.

However, a device used in a current mobile communication network, for example, a smartphone may have difficulty in directly performing the operation of receiving satellite signals and the operation of calculating the coordinates of a location due to a power consumption issue. Moreover, the device should synchronize with the plurality of GPS satellites, that is, should be locked to the plurality of GPS satellites in order to receive the satellite signals, and a few minutes may be taken for an initial GPS lock. The GPS lock issue may increase a time taken to actually detect the coordinates of a location.

In this context, a hybrid positioning scheme has been proposed, in which the coordinates of a location are detected based on a distance relationship between mobile communication BSs and a propagation state measurement, while GPS signals are used secondarily. This hybrid positioning scheme is called a network-assisted GPS-based positioning scheme or an assisted-GPS (A-GPS)-based positioning scheme. Therefore, the A-GPS-based positioning scheme may minimize a time taken to detect the coordinates of a location, while minimizing the power consumption of a device.

2) WiFi-Based Positioning

WiFi-based positioning schemes include triangulation and fingerprinting.

If triangulation is used, a device measures the received signal strengths (RSSs) of signals received from a plurality of APs, for example, three or more APs, converts the measured RSSs to distances, and detects the location of the device by an equation related to the distances.

However, since wireless signals experience multipath propagation such as attenuation, reflection, and diffraction, caused by walls, obstacles, persons, and so on in an indoor space, the converted distances may include a relatively large error from actual distances. Therefore, fingerprinting is usually used indoors because of the relatively large error of triangulation.

In the fingerprinting scheme, an indoor space is divided into relatively small cells, RSSs are collected directly from the respective cells, and a radio map is built by generating a database with the collected RSSs. A device compares received RSSs with the database, and estimates the location of a cell having the most similar signal pattern to be the location of the device. Accordingly, as a radio network environment gets better and the number of cells increases, the fingerprinting scheme may increase positioning precision.

The fingerprinting scheme is difficult to use in a region without WiFi APs, takes a relatively long time to build a radio map, and consumes much cost. Further, if a change occurs to the radio map due to replacement or movement of an AP, the database should be re-generated, thus causing maintenance and repair cost.

3) Cellular BS-Based Positioning

Cellular BS-based positioning schemes include a BS ID-based positioning scheme and a triangulation scheme.

In the BS ID-based positioning scheme, a device detects the ID of a serving BS connected to the device. The device determines whether it is connected to the BS, measures the round trip time (RTT) between the BS and the device, converts the measured RTT to a distance, and then detects the existence of the device within a radius of Xm or Xkm from the serving BS. The distance may be calculated by multiplying the measured RTT by the speed of light (time× speed of light=distance).

However, since only a relative distance with respect to a serving BS may be detected in the BS ID-based positioning scheme, it is impossible to use the BS ID-based positioning scheme in a service requiring absolute coordinates, for example, a latitude and a longitude.

Meanwhile, a downlink signal or an uplink signal may be used in the triangulation scheme using a plurality of BSs, for example, one serving BS and two or more adjacent BSs. First, in the case where downlink signals are used, a device receives signals from a plurality of BSs whose locations are known to the device, and estimates a propagation delay from the reception timing measurements of the received signals. Then, the device transmits the estimated propagation delay to a positioning server, and the positioning server converts the received propagation delay to a distance, and estimates the coordinates of the location of the device by an equation related to the converted distance. This downlink-using triangulation scheme is referred to as an observed time difference of arrival (OTDoA) scheme in the 3GPP LTE standards.

Further, the uplink-using triangulation scheme is called an uplink time difference of arrival (UTDoA) scheme in the 3GPP. In the UTDoA scheme, a plurality of BSs including a serving BS estimate propagation delays by receiving a positioning signal from a device, and transmit the estimated propagation delays to a positioning server. The positioning server converts the propagation delays received from the plurality of BSs to distances, and estimates the coordinates of the location of the device by an equation related to the converted distances.

After experiencing multipath propagation, signals used in the above cellular BS-based positioning scheme may be received at an entity which performs a positioning operation, which may be a main cause of decreasing positioning accuracy.

Meanwhile, an iOS-based smartphone and an Android OS-based smartphone receive location information in the order of the GPS-based positioning scheme, the WiFi-based positioning scheme, and the cellular BS-based positioning scheme according to the error ranges of the location information. A hybrid scheme using these various positioning schemes in combination makes it possible to use the BS-based positioning scheme outdoors in an urban region which may not be covered by the GPS-based positioning scheme, and to use the WiFi-based positioning scheme indoors where a GPS signal is not received.

Meanwhile, an iOS-based smartphone and an Android OS-based smartphone provide various LBSs, and there are various positioning precision requirements for the various LBSs. To satisfy the various positioning precision requirements, high-precision positioning may be needed. This high-precision positioning may be difficult to perform with the GPS-based positioning scheme, the WiFi-based positioning scheme, and the BS-based positioning scheme, as described below in detail.

First, although the GPS-based positioning scheme may acquire a relatively high precision, for example, below an error of 5 m, it requires at least three satellite signals to support the precision. However, signals from satellites are blocked in an urban region with a large number of buildings, such as a dense urban region, and in an indoor environment. Accordingly, the GPS-based positioning scheme is not viable in the urban region and the indoor environment.

Secondly, although the WiFi-based positioning scheme may achieve a precision error, for example, below 5 m in an indoor environment, the current precision of the WiFi-based positioning scheme is not viable for an LBS such as indoor navigation as listed in Table 1. Further, the WiFi-based positioning scheme may not be used in an outdoor environment without WiFi APs.

Thirdly, the BS-based positioning scheme may not be preferred because of its error of a few hundred meters to a few kilometers.

As described above, GPS-based positioning, WiFi-based positioning, and BS-based positioning have limitations in positioning precision and use environment. Accordingly, there is a need for an additional positioning scheme to provide various LBSs.

Meanwhile, various applications of providing LBSs are provided through an iOS-based smartphone and an Android OS-based smartphone by GPS-based positioning, WiFi-based positioning, and BS-based positioning. These applications may be used very conveniently for the purpose of detecting the location of a device or the location of its correspondent device.

However, various applications of providing LBSs by GPS-based positioning, WiFi-based positioning, and BS-based positioning, proposed so far, require a user's direct activation of a corresponding function, that is, a positioning function. For example, to receive an LBS, the user activates a GPS function, a WiFi function, and a Bluetooth function, or directly executes a corresponding application so that the application activates the GPS function, the WiFi function, and the Bluetooth function.

Therefore, the various applications which provide LBSs by GPS-based positioning, WiFi-based positioning, and BS-based positioning may not be viable in an emergency situation such as a natural disaster like earthquake or tsunami, or a human-caused disaster such as a fire or poor construction, which results in building collapse and burial of persons. This is because a buried person may be placed in a situation where it is difficult to activate a corresponding person. In addition, even though the corresponding function is activated, infrastructure in the surroundings may be destroyed in such an emergency situation as building collapse, making WiFi-based positioning impossible. Since the buried person is indoors, GPS-based positioning may be impossible.

Accordingly, an embodiment of the disclosure proposes a method for detecting a location in a D2D scheme by a device which intends to detect the location, that is, a target D2D device.

In an embodiment of the disclosure, a target D2D device may be a D2D device carried by a user who is to be positioned such as a missing person, a missing child, a survivor, or a sexual offender.

Further, in an embodiment of the disclosure, a D2D device is a device equipped with a D2D function, and may be, for example, a smartphone, a tablet PC, a smart watch, a smart band, a smart necklace, or a smart ring.

Further, an embodiment of the disclosure proposes a method for activating a positioning function of a target D2D device by a third party D2D device other than the target D2D device.

In an embodiment of the disclosure, a third party D2D device is a device which is to detect the location of a target D2D device, and may be a D2D device carried by, for example, a protector or a rescuer.

Further, an embodiment of the disclosure proposes a method for distinguishing a target D2D device from a normal D2D device. The normal D2D device is a D2D device other than the target D2D device. First, a method for detecting the location of a target D2D device in a communication system supporting a D2D scheme according to an embodiment of the disclosure will be described below.

The method for detecting the location of a target D2D device in a communication system supporting a D2D scheme according to an embodiment of the disclosure may be divided into two methods, that is, a method for detecting the location of a target D2D device based on urgently installed reference D2D devices and a method for detecting the location of a target D2D device based on existing installed reference D2D devices.

First, the method for detecting the location of a target D2D device based on urgently installed reference D2D devices will be described below.

In the method for detecting the location of a target D2D device based on urgently installed reference D2D devices, the following is assumed.

(1) Assumption 1

If a building collapses due to a natural disaster such as earthquake or tsunami, or a human-caused disaster such as a fire or poor construction, D2D devices having the D2D function may be installed urgently. A D2D device having the D2D function may be a special device for disasters used by a firefighter, a police officer, or a rescue team, or a D2D device mounted on a fire engine, a police car, or an ambulance.

(2) Assumption 2

It is assumed that a user placed in a specific situation, for example, a buried person carries a D2D device equipped with the D2D function, such as a smartphone, a smart band, a smart necklace, or a smart watch. Herein, the D2D device of the user placed in the specific situation is a target D2D device.

Further, D2D devices carried by rescuers, for example, a rescue team are capable of acquiring their own absolute coordinates (X, Y, Z) with assistance of a GPS or a network. Further, it is assumed that the target D2D device is in a power-on state, and the GPS function, Bluetooth function, and WiFi function of the target D2D device have not been activated.

Under the above assumptions, the method for detecting the location of a target D2D device based on urgently installed reference D2D devices will be described below in detail.

First, reference D2D devices capable of executing the positioning function are installed in a region placed in a specific situation. Herein, the specific situation may be an emergency situation such as collapse of a building due to a natural disaster like earthquake or tsunami or a human-caused disaster such as a fire or poor construction, leading to burial of a person under the collapsed building. For the convenience of description, the region placed in the specific situation will be referred to as a target region. The installed reference D2D devices may be, for example, special D2D devices for disasters used by firefighters, police officers, or a rescue team, or D2D devices mounted on fire engines, police cars, or ambulances. The installed reference D2D devices transmit discovery request messages to discover the target D2D device. Upon receipt of the discovery request messages from the reference D2D devices, the target D2D device transmits a discovery response message to the discovery request messages.

Upon receipt of the discovery response message from the target D2D device, the reference D2D devices transmit notification messages indicating that a D2D positioning operation is to be performed to the target D2D device. Upon receipt of the notification messages from the reference D2D devices, the target D2D device performs the positioning operation.

However, if the GPS function, WiFi function, and Bluetooth function of the target D2D device are in an off state or the user of the target D2D device is placed in a state where the user is not capable of directly executing a corresponding application, the D2D positioning function should be automatically activated without intervention of the user.

Therefore, a third party D2D device other than the target D2D device activates the D2D function in an embodiment of the disclosure. Further, the target D2D device which is to be positioned may be coexistent with normal D2D devices, for example, D2D devices carried by on-lookers in a region in which the corresponding situation has occurred.

Therefore, an embodiment of the disclosure proposes a method for distinguishing a target D2D device (a D2D device of a target) from a normal D2D device in such an environment. A detailed description of the method will be given later, and thus is not provided herein.

Secondly, the method for detecting the location of a target D2D device based on existing installed reference D2D devices will be described below.

The following is assumed in the method for detecting the location of a target D2D device based on existing installed reference D2D devices.
(1) Assumption 1

D2D devices installed in stores may broadcast information such as information about issuance of a free coupon and discount information to nearby D2D devices by discovery request messages. Such D2D devices which have been installed for commercial purposes may be used to detect the location of a target D2D device carried by a missing child, a sexual offender, or the like. Therefore, it is assumed that a third party such as a protector or an observer and a target such as a missing child or a sexual offender carry D2D devices such as smartphones, smart watches, or smart bands which are equipped with the D2D function, and a specific application is installed in the corresponding D2D devices.
(2) Assumption 2

It is assumed that D2D devices installed in stores have prior knowledge of their own absolute coordinates (X, Y, Z) at the time of installing the D2D devices or through a network. It is also assumed that a target D2D device is in the power-on state, and its GPS function, WiFi function, and Bluetooth function are in the off state.

Under the above assumptions, the method for detecting the location of a target D2D device based on existing installed reference D2D devices will be described below in detail.

Once a specific application is executed in a third party D2D device, a D2D server activates existing installed D2D devices located in a target region. The activated D2D devices broadcast discovery request messages including the ID of the target device, received from the D2D server, without further broadcasting discovery request signals including free coupon issuance information and discount information.

Upon receipt of the discovery request messages including the target ID from the activated D2D devices, the target D2D device transmits a discovery response message to the discovery request messages. Upon receipt of the discovery response message from the target D2D device, the existing installed D2D devices in the target region transmit notification messages indicating that a D2D positioning operation is to be performed to the target D2D device. Upon receipt of the notification messages, the target D2D device performs the positioning operation.

However, if the GPS function, WiFi function, and Bluetooth function of the target D2D device are in the off state or the user of the target D2D device is placed in a state where the user is not capable of directly executing a corresponding application, the positioning function should be automatically activated without intervention of the user. Therefore, a third party D2D device other than the target D2D device activates the D2D function in an embodiment of the disclosure. A detailed description of the operation will be given later, and thus is not provided herein.

The methods for detecting the location of a target D2D device in a communication system supporting a D2D scheme according to embodiments of the disclosure have been described above. Now, a description will be given below of a method for activating the positioning function of a target D2D device by a third party D2D device other than the target D2D device in a communication system supporting a D2D scheme according to an embodiment of the disclosure.

The method for activating the positioning function of a target D2D device by a third party D2D device other than the target D2D device in a communication system supporting a D2D scheme according to an embodiment of the disclosure may be divided into two methods, that is, a method for activating the positioning function of a target D2D device by a third party D2D device based on urgently installed reference D2D devices, and a method for activating the positioning function of a target D2D device by a third party D2D device based on existing installed reference D2D devices.

First, reference D2D devices urgently installed in a target region broadcast discovery request messages. Upon receipt of the broadcast discovery request messages from the reference D2D devices, a target D2D device transmits a discovery response message to the received discovery request messages, the discovery response message including the ID of the target D2D device. The target D2D device, which has transmitted the discovery response message, recognizes that a positioning signal required for the target D2D device to perform a positioning operation will be transmitted soon by the reference D2D devices. Therefore, the discovery request messages may be configured by modifying a discovery message defined in the current 3GPP TS 24.334 in order to support the method for activating the positioning function of a target D2D device based on urgently installed reference D2D devices by a third party D2D device according to an embodiment of the disclosure.

The discovery message may be configured to be, for example, 232 bits. The discovery message includes, for example, an 8-bit message type field, a 184-bit proximity-based service (ProSe) application code field, a 32-bit message integrity check (MIC) field, and an 8-bit coordinated universal time-based counter least significant bit (UTC-based counter LSB) field.

The message type field includes a 2-bit discovery type field, a 4-bit spare field, and a 2-bit discovery model field.

In an embodiment of the disclosure, a reference D2D device transmits a discovery request message with a reserved field value of the discovery type field or the discovery model field set to a value indicating that an urgent D2D positioning operation is to be performed, to thereby enable the third party D2D device to activate the positioning function of a target D2D device based on the urgently installed reference D2D devices. For example, '00' and '11' among the values of the discovery type field are reserved. Therefore, if '00' among the values of the discovery field is set to indicate that the urgent D2D positioning operation is to be performed, upon receipt of a discovery request message with a discovery field set to '00', the target D2D device may activate the positioning function in an embodiment of the disclosure.

Meanwhile, upon receipt of the discovery request message, the target D2D device transmits a discovery response message including the ID of the target D2D device, for example, the MAC address of the target D2D device.

In another example, D2D devices carried by a rescue team rushing to a target region transmit, to a ProSe application server or a D2D server, ProSe application code allocation request messages requesting allocation of a specific ProSe application code to activate the D2D positioning function.

Upon receipt of the ProSe application code allocation request messages, the ProSe application server allocates a specific ProSe application code to the D2D devices carried by the rescue team in the target region, that is, the reference D2D devices, and transmit, to the reference D2D devices, a ProSe application code allocation response message including the allocated ProSe application code. Upon receipt of the ProSe application code allocation response message from the ProSe application server, the reference D2D devices broadcast, to the target region, discovery request messages including the ProSe application code included in the ProSe application code allocation response message.

Upon receipt of the discovery request messages including the ProSe application code, broadcast from the reference D2D devices, the target D2D device transmits a discovery response message including the ID of the target D2D device.

Secondly, a method for activating the positioning function of a target D2D device based on existing installed reference D2D devices by a third party D2D device will be described below.

Once an application is executed in a third party D2D device, the ID of a target D2D device and information about a target region are transmitted to a ProSe application server via a PC1 interface. Herein, the PC1 interface is an interface between the ProSe application server and the application installed in the D2D device. The ID of the target device may be registered when the application is initially installed.

Meanwhile, if the ID of the target device and the information about the target region are transmitted to the ProSe application server via the PC1 interface, the ProSe application server maps between an application user ID or the ID of the target device and an evolved packet core (EPC) ProSe user ID, and transmits the mapped IDs to a ProSe function entity via a PC2 interface. The PC2 interface is an interface between the ProSe application server and the ProSe function entity.

The ProSe function entity generates a specific application code indicating urgent D2D discovery or a specific application code requesting automatic activation of the D2D positioning function. The ProSe function entity transmits the generated application code to D2D devices already installed in stores via PC3 interfaces. The PC3. interfaces are interfaces between the ProSe function entity and the D2D devices.

Upon receipt of the specific application code from the ProSe function entity, the D2D devices, that is, the reference D2D devices transmit urgent discovery request messages, discontinuing usual transmission of normal discovery request messages. To indicate urgent discovery and automatic activation of the D2D positioning function by the specific application code, a reserved field value of the discovery type field, the discovery model field, or the spare field included in the discovery request message may be used, as described before.

The method for activating the positioning function of a target D2D device by a third party D2D device other than the target D2D device in a communication system supporting a D2D scheme according to an embodiment of the disclosure has been described above. Now, a description will be given of a method for distinguishing a target D2D device from a normal D2D device in a communication system supporting a D2D scheme according to an embodiment of the disclosure.

In the method for detecting the location of a target D2D device based on urgently installed reference D2D devices, all D2D devices around the reference D2D devices as well as the target D2D device are capable of receiving discovery request messages transmitted by the reference D2D devices. That is, D2D devices carried by on-lookers and passers-by in a region near to the target D2D device may also receive the discovery request messages. Accordingly, there is a need for distinguishing a target D2D device from a normal D2D device in order to accurately detect the number of actual target D2D devices located in a target region and the types of located D2D devices. For example, there is a need for distinguishing a target D2D device from a normal D2D device in order to determine the number of persons buried in a region in which an emergency situation such as building collapse has occurred, and who are the buried persons.

The method for distinguishing a target D2D device from a normal D2D device in a communication system supporting a D2D scheme according to an embodiment of the disclosure may be divided largely into two methods, that is, a method in which all D2D devices transmit discovery response messages to a specific discovery request message transmitted by a reference D2D device, and the reference D2D device distinguishes a target D2D device from a normal D2D device based on the discovery response messages, and a method in which only a target D2D device transmits a discovery response message to a specific discovery request message transmitted by a reference D2D device, and the reference D2D device distinguishes the target D2D device from a normal D2D device based on the discovery response message.

First, a description will be given below of the method in which all D2D devices transmit discovery response messages to a specific discovery request message transmitted by a reference D2D device, and the reference D2D device distinguishes a target D2D device from a normal D2D device based on the discovery response messages.

Reference D2D devices, which have been urgently installed in a target region, broadcast specific discovery request messages, each including a ProSe application code. Upon receipt of the specific discovery request messages, all D2D devices located in the target region perform a positioning operation, and transmit positioning result values in discovery response messages including the IDs of the D2D devices to a ProSe application server. The positioning result values may be acquired by the GPS function, the WiFi function, the Bluetooth function, etc. That is, the D2D devices, which have received the specific discovery request messages, transmit the absolute coordinates of the D2D devices to the ProSe application server by using all available positioning functions.

The ProSe application server transmits coordinate information about the D2D devices together with a map of the target region to the reference D2D devices. Then, location information about all D2D devices in the target region is output through the displays of the reference D2D devices. Therefore, the reference D2D devices may identify the target D2D device based on the location information about all D2D devices located in the target region. For example, users carrying or managing the reference D2D devices, for example, a rescue team may distinguish the target D2D device from normal D2D devices based on the location information about the D2D devices, output through the displays of the reference D2D devices.

However, the method in which all D2D devices transmit discovery response messages to a specific discovery request message transmitted by a reference D2D device, and the reference D2D device distinguishes a target D2D device from a normal D2D device based on the discovery response messages may cause much signaling overhead because all D2D devices in a target region transmit their coordinate information to a ProSe application server. Moreover, since all D2D devices in the target region perform positioning operations by the GPS function, the WiFi function, and the Bluetooth function, the method may not be used in a region in which infrastructure has been destroyed.

Secondly, a description will be given below of the method in which only a target D2D device transmits a discovery response message to a specific discovery request message transmitted by a reference D2D device, and the reference D2D device distinguishes the target D2D device from a normal D2D device based on the discovery response message.

Upon receipt of specific discovery request messages from reference D2D devices urgently installed in a target region, D2D devices output the specific discovery request messages on their displays. For example, if the specific discovery request messages are received at a corresponding D2D device, a pop-up window may be activated. Information used to determine whether the corresponding D2D device is a target D2D device or a normal D2D device may be included in the pop-up window.

Meanwhile, since some of target D2D devices may not be capable of clicking on pop-up windows, if a D2D device fails to receive a response for a pop-up window for a predetermined time period after receiving the specific discovery request messages, the D2D device may determine that it is a target D2D device.

Meanwhile, in an embodiment of the disclosure, a target D2D device may be distinguished from a normal D2D device by means of various sensors such as a motion sensor and a heart rate sensor. For example, if a motion sensor included in a corresponding D2D device detects a general motion pattern such as walk, run, or the like, the D2D device does not transmit a discovery response message to the specific discovery request messages received from the reference D2D devices. On the contrary, if the motion pattern detected by the motion sensor is not a general motion pattern, the D2D device transmits a discovery response message to the specific discovery request messages received from the reference D2D devices. In this case, the discovery response message includes the ID of the D2D device.

Further, in an embodiment of the disclosure, among D2D devices which have received the specific discovery request messages from the reference D2D devices, only a D2D device which has detected a specific motion pattern through a motion sensor, not responding to a pop-up window for a predetermined time period transmits a discovery response message to the specific discovery request messages. In this case, the discovery response message includes the ID of the D2D device.

The methods for distinguishing a target D2D device from a normal D2D device in a communication system supporting a D2D scheme according to embodiments of the disclosure has been described above. Now, specific operation scenarios in a communication system supporting a D2D scheme according to an embodiment of the disclosure will be described. A description will first be given of an operation scenario of using reference D2D devices urgently installed in a target region.

Urgently installed reference D2D devices broadcast discovery request messages. It may be explicitly indicated that the discovery request messages are urgent discovery request messages and are intended for positioning by means of reserved field values of the discovery type fields, discovery model fields, or spare fields included in the discovery request messages.

On the other hand, the reference D2D devices may broadcast discovery request messages each including a specific ProSe application code, and the specific ProSe application code may implicitly indicate that the corresponding discovery request message is an urgent discovery request message, and is intended for positioning. The ProSe application codes transmitted by the reference D2D devices include specific IDs. The specific IDs may be the IDs of D2D devices carried by, for example, rescuers such as firefighters, police officers, or a rescue team. The specific IDs may be used only by pre-authorized D2D devices, and the D2D devices have prior knowledge of information related to the specific IDs. For example, when the D2D devices are connected to a network, the D2D devices may receive the information related to the specific IDs from the network, or the information related to the specific IDs may be preserved in the D2D devices.

Upon receipt of the specific discovery request messages from the reference D2D devices, a D2D device transmits a discovery response messages to the specific discovery request messages. Herein, a discovery response message may be transmitted by any D2D device or only a target D2D device. Meanwhile, a ProSe application code included in the discovery response message includes the ID of the corresponding D2D device, and the ID of the corresponding D2D device and a ProSe application code transmitted by a reference D2D device, that is, the authorized ID form a specific combination.

For example, the corresponding D2D device may set, as its ID, K LSBs or MSBs of the ProSe application code included in the specific discovery request message.

In another example, the D2D device may set, as its ID, an exclusive OR (XOR) of the ProSe application code included in the specific discovery request message and a ProSe application code generated based on its ID.

In another example, the D2D device may set, as its ID, a new ProSe application code generated by a function with an allocated ID and the ID of the D2D device as inputs. The function with the allocated ID and the ID of the D2D device as inputs is known to all D2D devices. The corresponding D2D device may receive parameters for executing the function through the network, or the parameters for executing the function may be preserved in the D2D device.

Upon receipt of the discovery response message from the target D2D device, the reference D2D devices broadcast D2D synchronization signals, for example, side-link synchronization signals (SLSSs) and physical side link broadcast channel (PSBCH) signals. The PSBCH signals may include information related to a bandwidth used for positioning.

Further, after transmitting the PSBCH signals, the reference D2D devices broadcast physical side link control channel (PSSCH) signals. The PSSCH signals may include the ID of the target D2D device which is to be positioned. Further, the PSCCH signals may include information related to a time during which the target D2D device may perform a positioning operation. For example, the time during which the target D2D device may perform a positioning operation may be represented in subframes. For example, information about subframes in which the target D2D device may perform a positioning operation may be transmitted in a bitmap. For example, if a bitmap of "101100 . . . " is included in the PSCCH signals, the target D2D device may determine that the positioning operation may be performed in the first, third, and fourth subframes.

After transmitting the SLSSs, PSBCH signals, and PSCCH signals, the reference D2D devices transmit physical side link shared channel (PSSCH) signals. The PSSCH signals may include the absolute coordinates (latitude, longitude, altitude, etc.) of the reference D2D devices.

Secondly, an operation scenario of using existing installed reference D2D devices will be described below.

Existing installed reference D2D devices broadcast discovery request messages. It may be explicitly indicated that the discovery request messages are urgent discovery request messages and are intended for positioning by means of reserved field values of the discovery type fields, discovery model fields, or spare fields included in the discovery request messages.

On the other hand, the reference D2D devices may broadcast discovery request messages each including a specific ProSe application code, and the specific ProSe application code may implicitly indicate that the corresponding discovery request message is an urgent discovery request message, and is intended for positioning.

The ProSe application codes transmitted by the reference D2D devices include the ID of a target D2D device. The ID of the target D2D device may be the ID of a target D2D device carried by, for example, a missing child, a missing pet, or a sexual criminal. When a corresponding application is installed, the ID of the target D2D device may be registered in the ProSe application server.

Upon receipt of the specific discovery request messages from the reference D2D devices, a D2D device transmits a discovery response message to the specific discovery request messages. Meanwhile, a ProSe application code included in the discovery response message includes the ID of the corresponding D2D device, and the ID of the corresponding D2D device may be identical to the ProSe application codes transmitted by the reference D2D devices, that is, the ID of the target D2D device.

Upon receipt of the discovery response message from the target D2D device, the reference D2D devices broadcast D2D synchronization signals, for example, SLSSs and PSBCH signals. The PSBCH signals may include information related to a bandwidth to be used for positioning.

Further, after transmitting the PSBCH signals, the reference D2D devices broadcast PSCCH signals. The PSCCH signals may include the ID of the target D2D device which will perform a positioning operation. In addition, the PSCCH signals may include information about a time during which the target D2D device may perform the positioning operation. Herein, the time during which the target D2D device may perform a positioning operation may be represented, for example, in subframes. For example, information about subframes in which the target D2D device may perform a positioning operation may be transmitted in a bitmap. For example, if a bitmap of "101100 . . . " is included in the PSCCH signals, the target D2D device may determine that the positioning operation may be performed in the first, third, and fourth subframes.

After transmitting the SLSSs, PSBCH signals, and PSCCH signals, the reference D2D devices transmit PSSCH signals. The PSSCH signals may include the absolute coordinates (latitude, longitude, altitude, etc.) of the reference D2D devices.

With reference to the attached drawings, operations of a communication system supporting a D2D scheme according to an embodiment of the disclosure will be described below in detail.

With reference to FIG. 1, an exemplary scenario of automatically detecting the location of a target D2D device in a communication system supporting a D2D scheme according to an embodiment of the disclosure will first be described.

FIG. 1 is a schematic view illustrating an exemplary scenario of automatically detecting the location of a target D2D device in a communication system supporting a D2D scheme according to an embodiment of the disclosure.

Before describing FIG. 1, it is to be noted that the scenario of automatically detecting the location of a target D2D device illustrated in FIG. 1 is a scenario of automatically detecting the location of a target D2D device by using urgently installed reference D2D devices.

Referring to FIG. 1, if a situation occurs which requires detection of the location of a target D2D device in a specific region, the specific region is set as a target region, and reference D2D devices are urgently installed in the region. These reference D2D devices perform an urgent discovery operation for the target D2D device, and acquire location information about the target D2D device based on urgent discovery results. The target D2D device, the reference D2D devices, the target region, and the urgent discovery operation have been described before, and thus a detailed description thereof will not be provided herein.

The exemplary scenario of automatically detecting the location of a target D2D device in a communication system supporting a D2D scheme according to an embodiment of the disclosure has been described above with reference to FIG. 1. Now, with reference to FIG. 2, another exemplary scenario of automatically detecting the location of a target D2D device in a communication system supporting a D2D scheme according to an embodiment of the disclosure will be described below.

Figure 2:
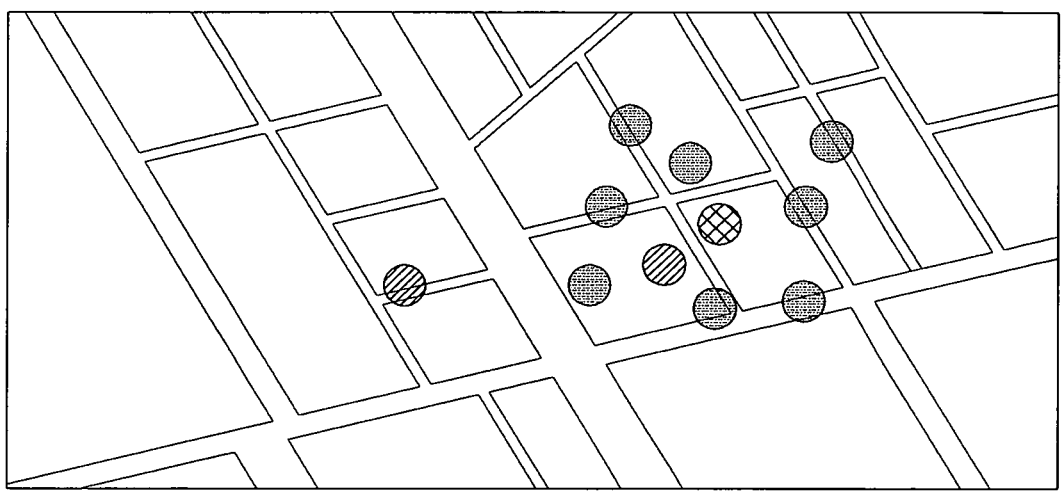
FIG. 2 is a schematic view illustrating another exemplary scenario of automatically detecting the location of a target D2D device in a communication system supporting a D2D scheme according to an embodiment of the disclosure.

FIG. 2 is a schematic view illustrating another exemplary scenario of automatically detecting the location of a target D2D device in a communication system supporting a D2D scheme according to an embodiment of the disclosure.

Before describing FIG. 2, it is to be noted that the scenario of automatically detecting the location of a target D2D device illustrated in FIG. 2 is a scenario of automatically detecting the location of a target D2D device by using D2D devices installed in stores.

Referring to FIG. 2, if a situation occurs which requires detection of the location of a target D2D device, a third party D2D device executes an urgent location detection application. The urgent location detection application requests D2D devices deployed in a target region in which the location of the D2D device needs to be detected. Therefore, the D2D devices installed in the target region perform an urgent discovery operation, and acquire location information about the target D2D device based on urgent discovery results. The target D2D device, the third party D2D device, the target region, the urgent discovery operation, and the urgent location detection application have been described before, and thus a detailed description thereof will not be provided herein.

Another exemplary scenario of automatically detecting the location of a target D2D device in a communication system supporting a D2D scheme according to an embodiment of the disclosure has been described above with reference to FIG. 2. Now, with reference to FIG. 3, the format of a discovery request message in a communication system supporting a D2D scheme according to an embodiment of the disclosure will be described below.

Figure 3:
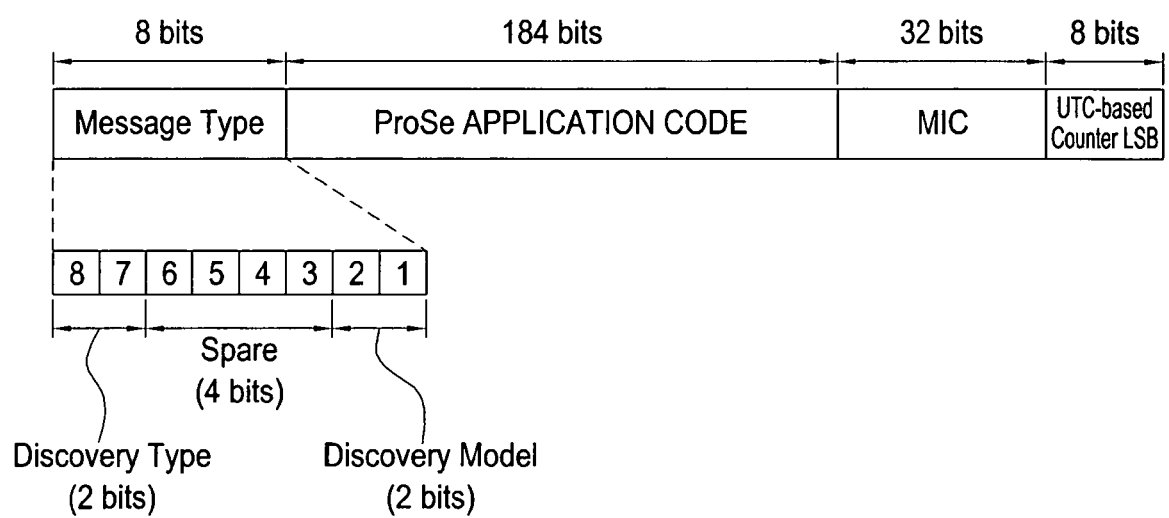
FIG. 3 is a schematic view illustrating the format of a search request message in a communication system supporting a D2D scheme according to an embodiment of the disclosure.

FIG. 3 is a schematic view illustrating the format of a discovery request message in a communication system supporting a D2D scheme according to an embodiment of the disclosure.

Referring to FIG. 3, the format of a discovery request message illustrated in FIG. 3 is the format of a discovery request message used to automatically activate a D2D urgent discovery operation and a D2D positioning operation according to an embodiment of the disclosure.

The discovery request message may be configured to be, for example, 232 bits long, and includes a message type field, a ProSe application code field, an MIC field, and a UTC-based counter LSB field. The message type field may be configured to be, for example, 8 bits, the ProSe application code field may be configured to be, for example, 184 bits, the MIC field may be configured to be, for example, 32 bits, and the UTC-based counter LSB field may be configured to be, for example, 8 bits.

Further, the message type field includes a discovery type field, a spare field, and a discovery model field. The discovery type field may be configured to be, for example, 2 bits, the spare field may be configured to be, for example, 4 bits, and the discovery model field may be configured to be, for example, 2 bits.

Meanwhile, whether a corresponding discovery is an urgent discovery may be indicated by defining a new discovery type field. For example, if the corresponding discovery is a normal discovery other than an urgent discovery, the discovery type field may be set to '00' (discovery type=00), and if the corresponding discovery is an urgent discovery, the discovery type field may be set to '11' (discovery type=11).

In another example, even though the corresponding discovery is an urgent discovery, the urgent discovery may or may not require a D2D positioning operation. The urgent discovery which does not require the D2D positioning operation may be used to determine only the proximity of a target D2D device, that is, to determine whether the target D2D device is located around a reference D2D device, rather than to detect the accurate location of the target D2D device, such as (X, Y, Z) coordinates representing the latitude, longitude, and altitude of the target D2D device. Therefore, if the corresponding discovery is not an urgent discovery, the discovery type field may be set to '00' (discovery=00). If the corresponding discovery is an urgent discovery which does not require D2D positioning, the discovery type field may be set to '01' (discovery type=01). If the corresponding discovery is an urgent discovery requiring D2D positioning, the discovery type field may be set to '11' (discovery type=11).

In another example, an urgent discovery operation may be implemented by defining a new discovery model field for D2D positioning in the format of a discovery request message, illustrated in FIG. 3. For example, if the corresponding discovery is an urgent discovery which does not require D2D positioning, the discovery model field may be set to '01' (discovery model=01), and if the corresponding discovery is an urgent discovery requiring D2D positioning, the discovery model field may be set to '11' (discovery model=11).

In another example, urgent discovery may be indicated by combining a new discovery type field with a new discovery model field in the format of a discovery request message, illustrated in FIG. 3. That is, if the discovery type field is set to '11' (discovery type=11), this indicates that the corresponding discovery is an urgent discovery. If the discovery type field is set to '11' and the discovery model field is set to '00' (discovery model=00), this indicates that the corresponding discovery is an urgent discovery which does not require D2D positioning. If the discovery type field is set to '11' and the discovery model field is set to '11' (discovery model=11), this indicates that the corresponding discovery is an urgent discovery requiring D2D positioning.

In contrast, information indicating whether the corresponding discovery is an urgent discovery, and information indicating whether D2D positioning is required may be known from the spare field included in the discovery request message. For example, a specific bit value among the bit values of two bits out of the 4 bits of the spare field may represent information indicating whether a corresponding discovery is an urgent discovery, and a specific bit value among the bit values of the other two bits of the spare field may represent information indicating whether D2D positioning is required.

On the other hand, information indicating whether the corresponding discovery is an urgent discovery and information indicating whether D2D positioning is required may be known from a ProSe application code included in the discovery request message, which will be described below in detail.

A 184-bit ProSe application code includes a 24-bit public land mobile network (PLMN) ID and a 160-bit ProSe application ID. If the ProSe application ID is used for commercial purposes, the ProSe application ID is configured in such a form as "broad-level business category (Level 0), business sub-category (Level 1)/business name (Level 2)/ . . . /Shop ID (Level N), i.e., restaurant business/McDonalds/discount coupon/ . . . /Kangnam branch".

Meanwhile, information indicating whether a corresponding discovery is an urgent discovery and information indicating whether D2D positioning is required may be configured by using the ProSe application ID as follows.

In the method for detecting the location of a target D2D device based on urgently installed reference D2D devices, the ProSe application ID may be configured to be, for example, "urgent discovery/buried search/D2D positioning or not/wrecker ID/ . . . /emergency region". In the method for detecting the location of a target D2D device based on existing installed reference D2D devices, the ProSe application ID may be configured to be, for example, "urgent discovery/missing child search/D2D positioning or not/target ID/ . . . /emergency region".

The above-described configurations are merely exemplary, and thus it is apparent that various ProSe application IDs may be configured by using ProSe application IDs pre-agreed between an urgently installed reference D2D device and a target D2D device, and between an existing installed reference D2D device and a target D2D device.

The format of a discovery request message in a communication system supporting a D2D scheme according to an embodiment of the disclosure has been described above with reference to FIG. 3. Now, a description will be given of the structure of a communication system supporting a D2D scheme according to an embodiment of the disclosure.

Figure 4:
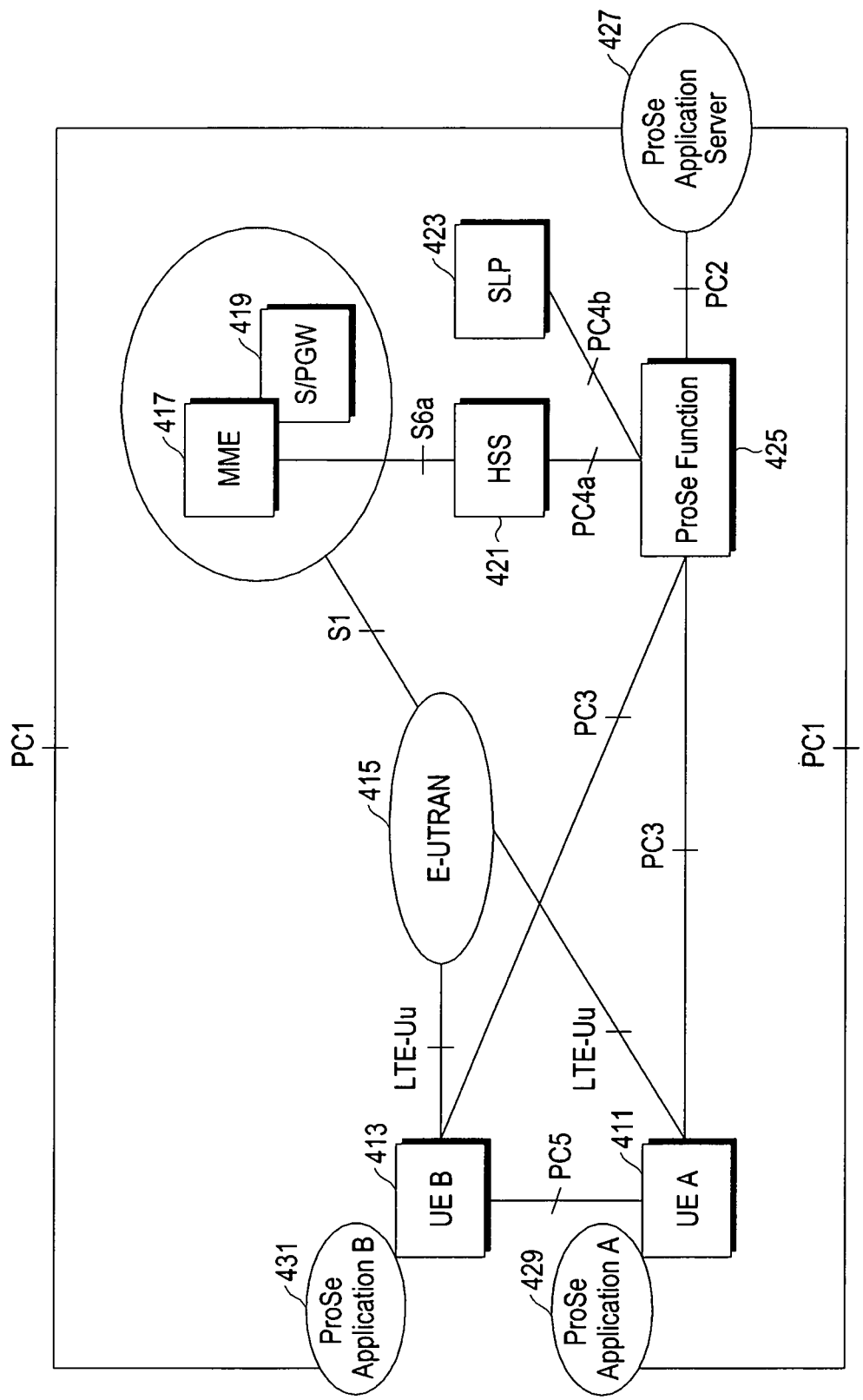
FIG. 4 is a schematic view illustrating the structure of a communication system supporting a D2D scheme according to an embodiment of the disclosure.

FIG. 4 is a schematic view illustrating the structure of a communication system supporting a D2D scheme according to an embodiment of the disclosure.

Referring to FIG. 4, the communication system includes a plurality of UEs, for example, UE A 411 and UE B 413, an MME 417, an S/PGW 419, an HSS 421, an SLP 423, a ProSe function entity 425, and a ProSe application server 427. Each of UE A 411 and UE B 413 may be connected to the MME 417 via an E-UTRAN 415. In addition, each of UE A 411 and UE B 413 may be a D2D device:

Once a ProSe application installed in each of UE A 411 and UE B 413 is executed, the ProSe application transmits and receives data and control information to and from the ProSe application server 427 via a PC1 interface. Herein, the ProSe application executed in UE A 411 is ProSe application A 429, and the ProSe application executed in UE B 413 is ProSe application B 432.

The ProSe application server 427 generates a ProSe application ID by mapping a user ID of an application layer to an EPC ProSe user ID. The ProSe function entity 425 maps an application ID generated by the ProSe application server 417 to a ProSe application code actually transmitted in a PHY layer. An interface between the ProSe application server 427 and the ProSe function entity 425 may be PC2. Further, interfaces between the Internet protocol (IP) layers of UE A 411 and UE B 413 may be PC3.

Further, the ProSe function entity 425 transmits and receives necessary data and control information to and from a home subscriber server (HSS) 421 and a service location protocol (SLP) layer 423 respectively via a PC4a interface and a PC4b interface.

With reference to FIG. 4, the structure of a communication system supporting a D2D scheme according to an embodiment of the disclosure has been described above. Now, a description will be given of a procedure for automatically detecting the location of a target D2D device in a communication system supporting a D2D scheme according to an embodiment of the disclosure, with reference to FIG. 5.

Figure 5:
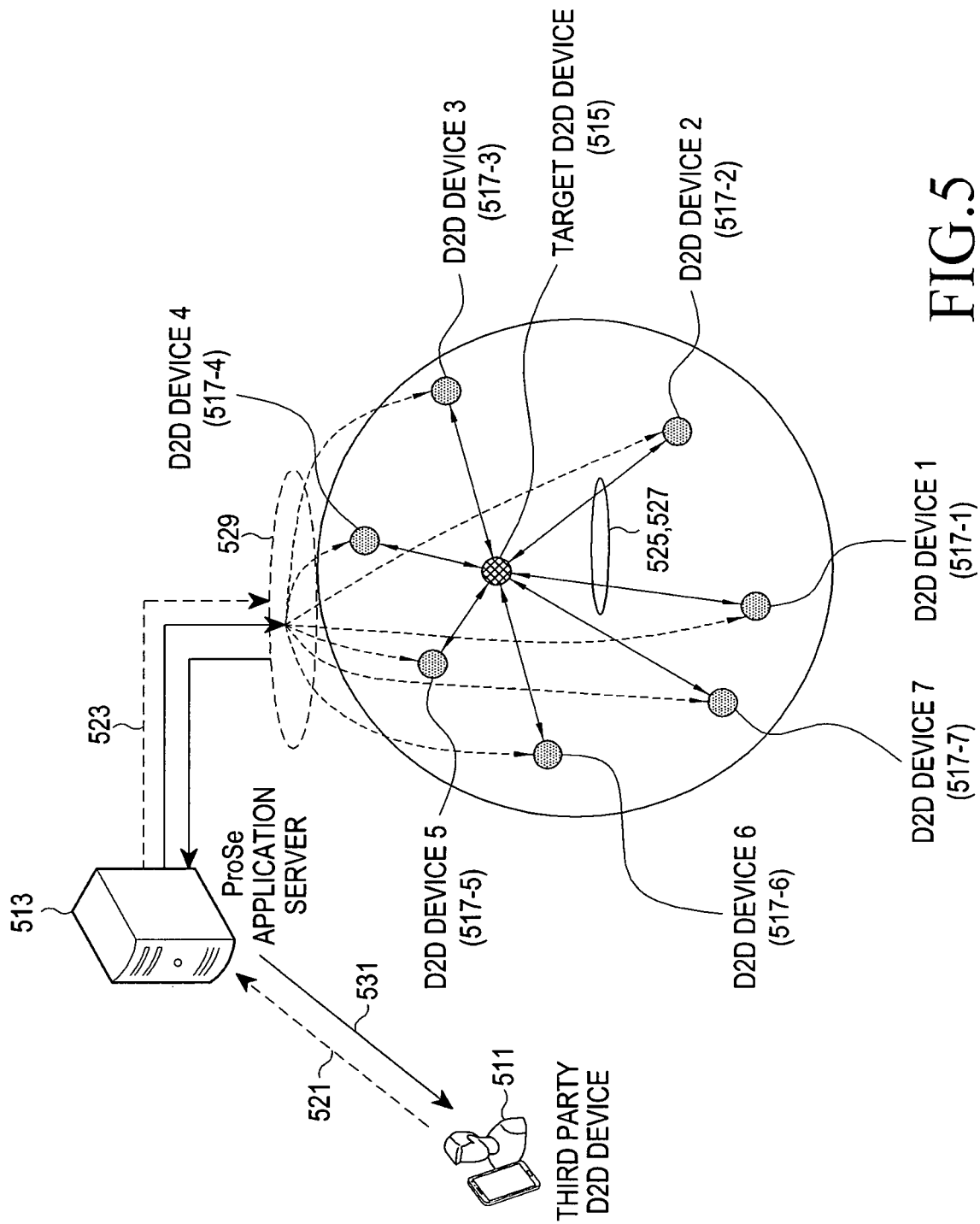
FIG. 5 is a diagram schematically illustrating a signal flow for a procedure for automatically detecting the location of a target D2D device in a communication system supporting a D2D scheme according to an embodiment of the disclosure.

FIG. 5 is a diagram schematically illustrating a signal flow for a procedure for automatically detecting the location of a target D2D device in a communication system supporting a D2D scheme according to an embodiment of the disclosure.

Referring to FIG. 5, the communication system includes a third party D2D device 511, a ProSe application server 513, a target D2D device 515, and a plurality of reference D2D devices, for example, 7 reference D2D devices which are, for example, D2D device 1 517-1, D2D device 2 517-2, D2D device 3 517-3, D2D device 4 517-4, D2D device 5 517-5, D2D device 6 517-6, and D2D device 7 517-7.

If a ProSe application installed in the third party D2D device 511, for example, a D2D device carried by a protector or an observer is executed, the ProSe application transmits an urgent discovery request, the ID of a target D2D device, and information about a target region to the ProSe application server 513 (521).

The ProSe application server 513 generates a specific ProSe application ID related to the urgent D2D discovery request and activation of a D2D positioning function, and transmits the generated specific ProSe application ID to the ProSe function entity (not shown in FIG. 5). The ProSe function entity generates a ProSe application code based on the ProSe application ID received from the ProSe application server 513. Although it is assumed in FIG. 5 that the ProSe function entity is incorporated in the ProSe application server 513, that is, the ProSe function entity and the ProSe application server 513 are placed in a one-to-one mapping relationship, it is apparent that one ProSe application server may manage a plurality of ProSe function entities.

The ProSe application server 513 activates the D2D devices located in the target region based on the information about the target region received from the ProSe application, that is, D2D device 1 517-1, D2D device 2 517-2, D2D device 3 517-3, D2D device 4 517-4, D2D device 5 517-5, D2D device 6 517-6, and D2D device 7 517-7 (523). If reference D2D devices in the target region perform a normal discovery operation such as issuance of a commercial coupon and transmission of discount information, priority may be given to an urgent discovery and positioning function activation command received from the ProSe application server 513.

Meanwhile, the D2D devices 517-1 to 517-7 in the target region broadcast discovery request messages including a ProSe application code. The ProSe application code may include the ID of the target D2D device 515, information indicating urgent or normal discovery, and information indicating whether D2D positioning is required. Upon receipt of the ProSe application code, the target D2D device 515 broadcasts a discovery response message including the ID of the target D2D device 515 in response to the ProSe application code (525 and 527).

Meanwhile, if urgent discovery is performed but D2D positioning is not performed, the D2D devices, which have received the ID of the target D2D device 515, report discovery of the target D2D device 515 to the ProSe application server 513 (529). The ProSe application server 513 may detect the location of the target D2D device 515 based on the reports received from the D2D devices.

Meanwhile, if urgent discovery is performed and D2D positioning is continuously performed, the D2D devices, which have received the ID of the target D2D device 515, sequentially transmit D2D synchronization signals for D2D positioning, for example, SLSSs, PSBCH signals, PSCCH signals, and PSSCH signals. The target D2D device 513 receives the SLSSs, the PSBCH signals, the PSCCH signals, and the PSSCH signals from the reference D2D devices, estimates the location of the target D2D device 513 based on the received SLSSs, PSBCH signals, PSCCH signals, and PSSCH signals, and broadcasts the location estimation result to the reference D2D devices (525 and 527).

Meanwhile, upon receipt of the location estimation result from the target D2D device 515, the reference D2D devices transmit the location estimation result to the ProSe application server 513 (529). The ProSe application server 513 notifies the third party D2D device requesting the urgent discovery and the D2D positioning function activation of the received location estimation result of the target D2D device 515 (531). Information about the location of the target D2D device 515 may be output in real time at the third party D2D device 511, like output of the location of a target and a route in a navigation system.

With reference to FIG. 5, the procedure for automatically detecting the location of a target D2D device in a communication system supporting a D2D scheme according to an embodiment of the disclosure has been described above. Now, a description will be given below of a procedure for automatically activating an urgent D2D discovery operation and a D2D positioning operation in a communication system supporting a D2D scheme according to an embodiment of the disclosure, with reference to FIG. 6.

Figure 6:
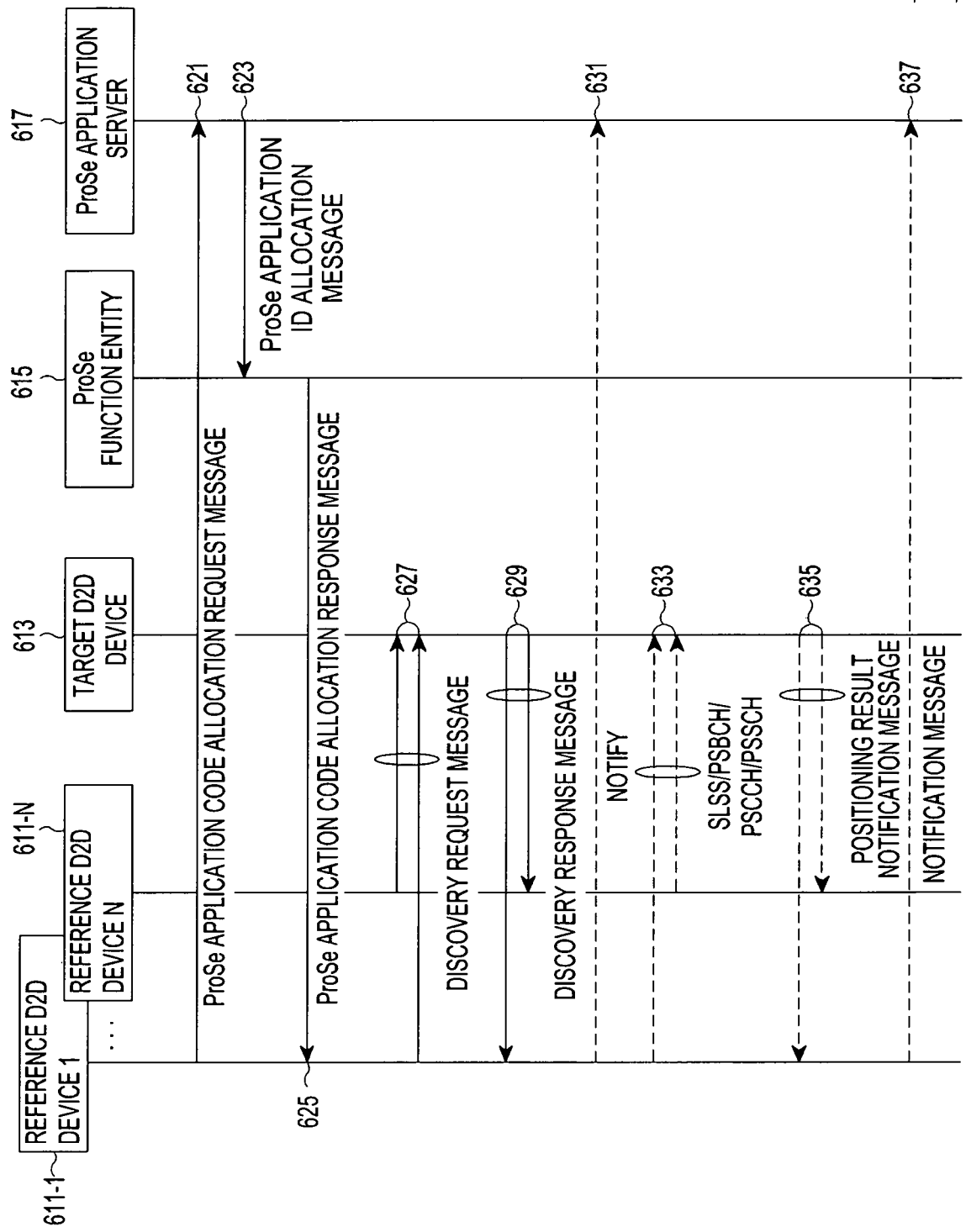
FIG. 6 is a schematic view illustrating an exemplary procedure for automatically activating an urgent D2D discovery operation and a D2D positioning operation in a communication system supporting a D2D scheme according to an embodiment of the disclosure.

FIG. 6 is a schematic view illustrating a procedure for automatically activating an urgent D2D discovery operation and a D2D positioning operation in a communication system supporting a D2D scheme according to an embodiment of the disclosure.

Referring to FIG. 6, the communication system includes a plurality of reference D2D devices, for example, N reference D2D devices which are, for example, reference D2D device 1 611-1 to reference D2D device N 611-N, a target D2D device 613, a ProSe function entity 615, and a ProSe application server 617.

Reference D2D device 1 611-1 to reference D2D device N 611-N may be reference D2D devices located in a target region, for example, D2D devices carried by an ambulance crew, rescuers, police officers, etc. which arrived in an emergency region, or D2D devices mounted in an ambulance and a police car.

Reference D2D device 1 611-1 transmits a ProSe application code allocation request message requesting allocation of a ProSe application code to the ProSe application server 617 (step 621). Reference D2D device 1 611-1 is a representative reference D2D device representing reference D2D device 1 611-1 to reference D2D device N 611-N, and may be, for example, a commander. Further, the ProSe application code allocation request message may be an existing message in the communication system, a message configured by modifying an existing message in the communication system, or a newly configured message in the communication system.

While the case in which only reference D2D device 1 611-1 being a representative reference D2D device transmits a ProSe application code allocation request message to the ProSe application server 617 has been described with reference to FIG. 6, it is apparent that all reference D2D devices may transmit ProSe application code allocation request messages to the ProSe application server 617. Herein, reference D2D device 1 611-1 has prior knowledge of the ID or the like of each of reference D2D device 2 (not shown in FIG. 6) to reference D2D device N 611-N, and it is assumed that reference D2D device 1 611-1 and reference D2D device 2 to reference D2D device N 611-N have already completed an authentication and authorization process with the ProSe application server 617.

Meanwhile, upon receipt of the ProSe application code allocation request message from reference D2D device 1 611-1, the ProSe application server 617 allocates a ProSe application ID to reference D2D device 1 611-1, and transmits a ProSe application ID allocation message including the allocated ProSe application ID to the ProSe function entity 615 (step 623). Herein, the ProSe application ID allocation message may be an existing message in the communication system, a message configured by modifying an existing message in the communication system, or a newly configured message in the communication system. Upon receipt of the ProSe application ID allocation message from the ProSe application server 617, the ProSe function entity 615 generates a ProSe application code for reference D2D device 1 611-1 in correspondence with the ProSe application ID.

The ProSe function entity 615 transmits a ProSe application code allocation response message including the generated ProSe application code (step 625). The ProSe application code allocation response message may be an existing message in the communication system, a message configured by modifying an existing message in the communication system, or a newly configured message in the communication system. Further, while the case in which the ProSe function entity 615 transmits the ProSe application code allocation response message only to reference D2D device 1 611-1 has been described with reference to FIG. 6, it is apparent that the ProSe function entity 615 may transmit the ProSe application code allocation response message to all reference D2D devices. Meanwhile, the ProSe application code included in the ProSe application code allocation response message may include an ID indicating to the target D2D device 613 whether an urgent D2D discovery operation and a D2D positioning operation are to be performed, or information equivalent to the ID.

Meanwhile, upon receipt of the ProSe application code allocation response message from the ProSe function entity 615, each of reference D2D device 1 611-1 to reference D2D device N 611-N detects the ProSe application code included in the ProSe application code allocation response message, and broadcasts a discovery request message including at least one of a ProSe application field, a discovery type field, a discovery model field, and a spare field including the ID indicating whether the urgent discovery operation and the D2D positioning operation are to be performed, to indicate whether the urgent discovery operation and the D2D positioning operation are to be performed (step 627).

Meanwhile, upon receipt of the discovery request message broadcast from each of reference D2D device 1 611-1 to reference D2D device N 611-N, the target D2D device 613 transmits a discovery response message to reference D2D device 1 611-1 to reference D2D device N 611-N in response to the discovery request messages (step 629). The discovery response message includes the ID of the target D2D device 613.

If the D2D positioning operation is not to be performed, reference D2D device 1 611-1 transmits, to the ProSe application server 617, a notification message indicating whether the target D2D device 613 has been discovered (step 631). All D2D devices which have discovered the target D2D device 613 may notify the ProSe application server 617 of the discovery of the target D2D device 613, or the commander, that is, the representative D2D device may notify the ProSe application server 617 of the discovery of the target D2D device 613.

Meanwhile, after the urgent D2D discovery operation, an additional D2D positioning operation may be performed. In this case, the urgently installed reference D2D devices which have received the discovery response message from the target D2D device 613 transmit SLSSs, PSBCH signals, PSCCH signals, and PSSCH signals (step 633). Herein, the SLSSs may be transmitted so that the target D2D device 613 synchronizes with the urgently installed reference D2D devices, and the PSBCH signals may be transmitted to indicate a bandwidth to be used for D2D positioning.

Further, the PSCCH signals include the ID of the target D2D device 613. Therefore, D2D devices other than the target D2D device 613 do not receive the subsequently transmitted PSSCH signals.

After decoding the PSCCH signals, the target D2D device 613 acquires the positions of time/frequency resources of the PSSCH signals, and performs a positioning operation based on the acquired positions of the time/frequency resources. If the positioning operation is completed, the target D2D device 613 broadcasts a positioning result notification message including a positioning result to the urgently installed reference D2D devices (step 635).

Upon receipt of the positioning result broadcast from the target D2D device 613, the reference D2D devices transmit the positioning result to the ProSe application server 617, and may transmit a notification message indicating termination of the corresponding situation to the ProSe application server 617 (step 637). In contrast, it is apparent that upon receipt of the positioning result from the target D2D device 613, the reference D2D devices transmit ACK messages for the positioning result notification message to the target D2D device 613, and may transmit the positioning result notification message to the ProSe application server 617.

Meanwhile, the procedure for automatically activating an urgent D2D discovery operation and a D2D positioning operation as described with reference to FIG. 6 is obviously applicable to various scenarios as well as the scenarios described with reference to FIGS. 1 and 2, which will be described below in detail.

For example, reference D2D devices are allocated a ProSe application code by a ProSe application server, and periodically transmit discovery request messages. Meanwhile, a target D2D device which moved into the hospital transmits a discovery response message including the ID of the target D2D device. Therefore, upon receipt of the discovery response message including the ID of the target D2D device, the reference D2D devices detect that the target D2D device has entered the hospital, and notify the ProSe application server or a separate server managed in the hospital of the entry of the target D2D device.

The reference D2D devices may help with positioning of the target D2D device by transmitting SLSSs/PSBCH signals/PSCCH signals/PSSCH signals, and so on to the target D2D device. The target D2D device notifies the reference D2D devices of a positioning result, and the reference D2D devices notify the ProSe application server or the separate server of the positioning result. Herein, the ProSe application server or the separate server may shorten a waiting time for which a user of the target D2D device waits to see a doctor, or guide the user of the target D2D device to a doctor's office by acquiring recent medical records and reservations of the user of the target D2D device.

In another example, reference D2D devices installed in a nursing home or the like are allocated a ProSe application code by a ProSe application server, and periodically transmit discovery request messages. Meanwhile, a target D2D device of a user who has agreed on providing of location information about the user, among users staying in the nursing home, periodically measures the location of the target D2D device, and reports the measurement result to the reference D2D devices or the ProSe application server, or a separate server interacting with the ProSe application server.

The location measurement result of the target D2D device may be reported periodically or only upon occurrence of a specific event. The specific event may be a movement pattern or motion pattern recorded by a motion sensor, which is different from a typical movement pattern or motion pattern. Further, the specific event may be a heart rate/blood pressure pattern recorded by a heart rate sensor/blood pressure sensor different from a typical heart rate/blood pressure pattern.

Meanwhile, although an exemplary procedure for automatically activating an urgent D2D discovery operation and a D2D positioning operation in a communication system supporting a D2D scheme according to an embodiment of the disclosure has been described above with reference to FIG. 6, various modifications may be made to FIG. 6. For example, while successive steps are illustrated in FIG. 6, the steps of FIG. 6 may overlap with each other, take place in parallel, be performed in a different order, or take place a plurality of times.

An exemplary procedure for automatically activating an urgent D2D discovery operation and a D2D positioning operation in a communication system supporting a D2D scheme according to an embodiment of the disclosure has been described above with reference to FIG. 6. Now, a description will be given of another exemplary procedure for automatically activating an urgent D2D discovery operation and a D2D positioning operation in a communication system supporting a D2D scheme according to an embodiment of the disclosure with reference to FIG. 7.

Figure 7:
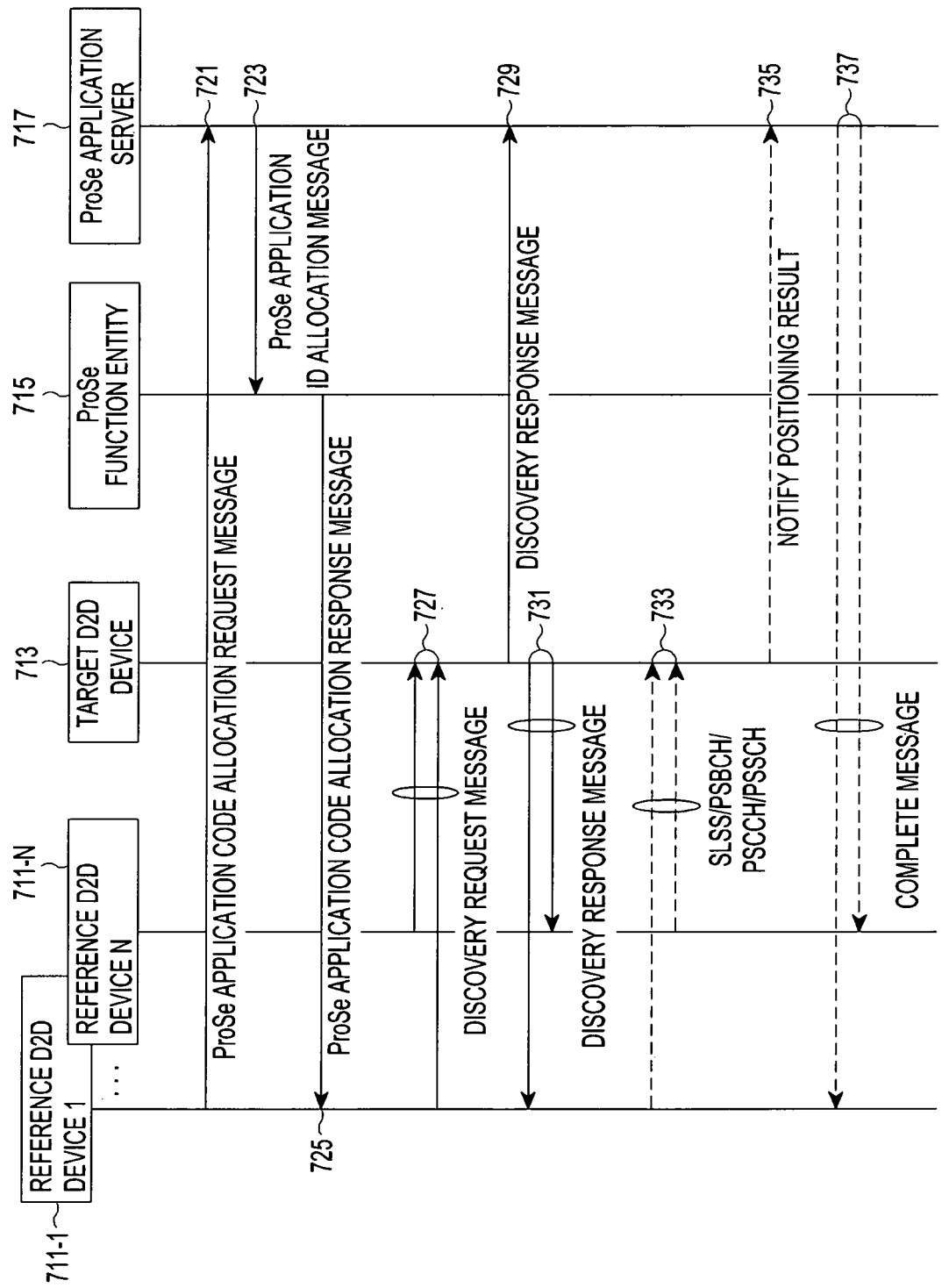
FIG. 7 is a schematic view illustrating another exemplary procedure for automatically activating an urgent D2D discovery operation and a D2D positioning operation in a communication system supporting a D2D scheme according to an embodiment of the disclosure.

FIG. 7 is a schematic view illustrating another exemplary procedure for automatically activating an urgent D2D discovery operation and a D2D positioning operation in a communication system supporting a D2D scheme according to an embodiment of the disclosure.

Referring to FIG. 7, the communication system includes a plurality of reference D2D devices, for example, N reference D2D devices which are, for example, reference D2D device 1 711-1 to reference D2D device N 711-N, a target D2D device 713, a ProSe function entity 715, and a ProSe application server 717.

The procedure for automatically activating an urgent D2D discovery operation and a D2D positioning operation, illustrated in FIG. 7 differs from the procedure for automatically activating an urgent D2D discovery operation and a D2D positioning operation, illustrated in FIG. 6, in that upon receipt of discovery request messages from urgently installed reference D2D devices, the target D2D device 713 may transmit a discovery response message to the discovery request messages to the ProSe application server 717 as well as the reference D2D devices (steps 729 and 731), and the target D2D device 713, which has performed a positioning operation, may transmit a positioning result to the reference D2D devices and also to the ProSe application server 717 (step 735). Therefore, upon receipt of the positioning result from the target D2D device 713, the ProSe application server 717 may notify the urgently installed reference D2D devices of termination of the situation by a complete message (step 737).

It is to be noted that in the procedure for automatically activating an urgent D2D discovery operation and a D2D positioning operation, illustrated in FIG. 7, a description of the same operations as performed in the procedure for automatically activating an urgent D2D discovery operation and a D2D positioning operation, illustrated in FIG. 6 is not provided herein.

Meanwhile, although FIG. 7 illustrates another exemplary procedure for automatically activating an urgent D2D discovery operation and a D2D positioning operation, it is apparent that various modifications may be made to FIG. 7. For example, while successive steps are illustrated in FIG. 7, the steps of FIG. 7 may overlap with each other, take place in parallel, be performed in a different order, or take place a plurality of times.

Another exemplary procedure for automatically activating an urgent D2D discovery operation and a D2D positioning operation in a communication system supporting a D2D scheme according to an embodiment of the disclosure has been described above with reference to FIG. 7. Now, a description will be given of another exemplary procedure for automatically activating an urgent D2D discovery operation and a D2D positioning operation in a communication system supporting a D2D scheme according to an embodiment of the disclosure with reference to FIG. 8.

Figure 8:
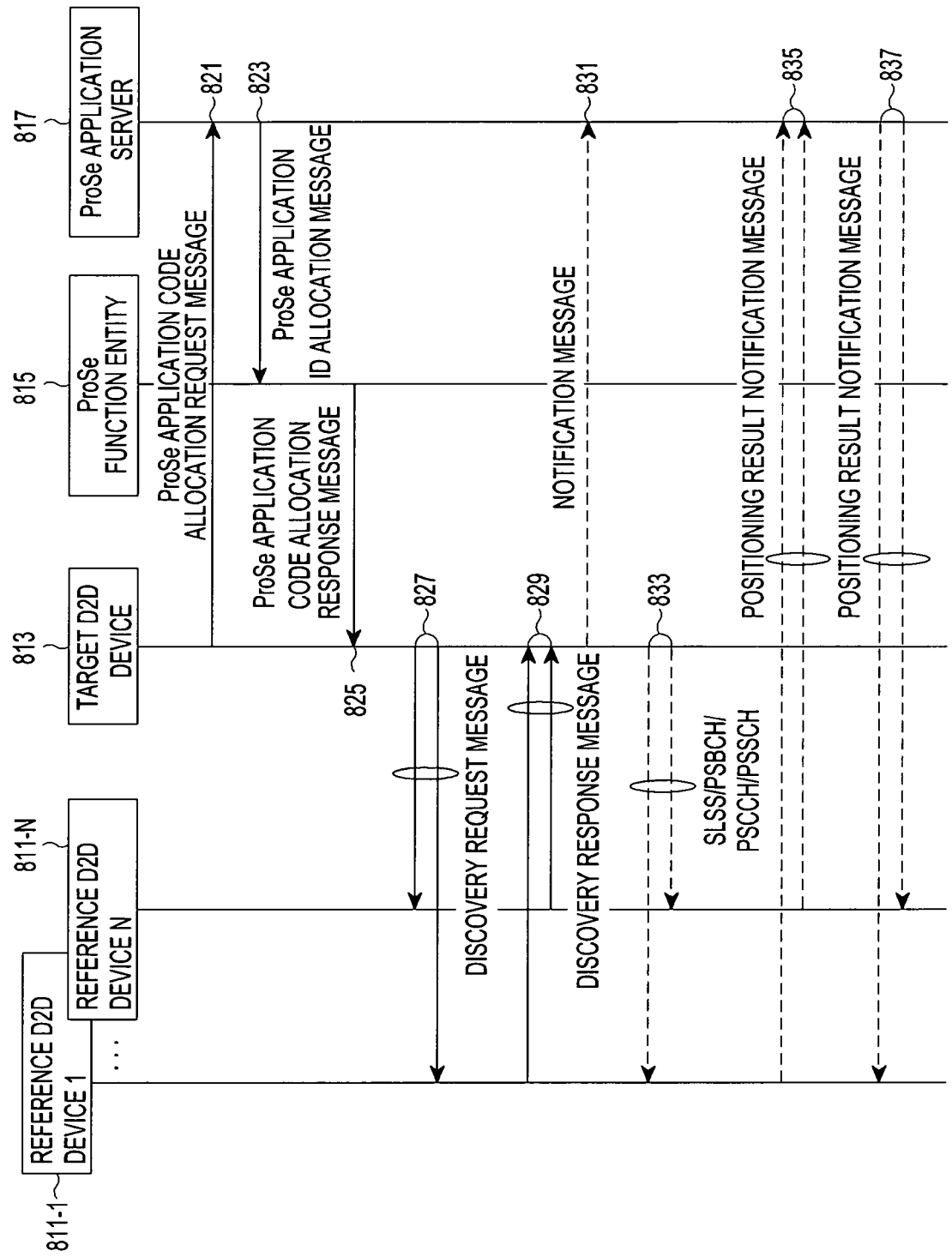
FIG. 8 is a schematic view illustrating another exemplary procedure for automatically activating an urgent D2D discovery operation and a D2D positioning operation in a communication system supporting a D2D scheme according to an embodiment of the disclosure.

FIG. 8 is a schematic view illustrating another exemplary procedure for automatically activating an urgent D2D discovery operation and a D2D positioning operation in a communication system supporting a D2D scheme according to an embodiment of the disclosure.

Referring to FIG. 8, the communication system includes a plurality of reference D2D devices, for example, N reference D2D devices which are, for example, reference D2D device 1 811-1 to reference D2D device N 811-N, a target D2D device 813, a ProSe function entity 815, and a ProSe application server 817.

The procedure for automatically activating an urgent D2D discovery operation and a D2D positioning operation, illustrated in FIG. 8 differs from the procedures for automatically activating an urgent D2D discovery operation and a D2D positioning operation, illustrated in FIGS. 6 and 7, in that the target D2D device 813 transmits a ProSe application code allocation request message to the ProSe application server 817 (step 821), and receives a ProSe application code allocation response message from the ProSe function entity 815 (steps 823 and 825), rather than the urgently installed reference D2D devices transmit ProSe application code allocation request messages to the ProSe application server 817, receive a ProSe application code allocation response message from the ProSe function entity 815, and transmit discovery request messages to the target D2D device 813.

Therefore, the target D2D device 813 transmits an allocation request message including the allocated ProSe application code to the urgently installed reference D2D devices which may be located in a target region, for example, an accident region or an operation area (step 827). The discovery request message may include one or more of the ID of the target D2D device 813, information indicating the battery status of the target D2D device 813, information related to the occurrence time of a corresponding situation in the target region, or the like. The occurrence time of the situation may be a time at which a motion pattern different from a typical motion pattern or a heart rate or blood pressure different from a usual heart rate or blood pressure is sensed through a motion sensor or bio sensor, for example, a heart rate sensor or a blood pressure sensor included in the target D2D device 813.

Meanwhile, upon receipt of the discovery request message, the urgently installed reference D2D devices may transmit discovery response messages including a common ID of the reference D2D devices, for example, a firefighter group ID or an emergency rescue team group ID (step 829). Upon receipt of the discovery response messages, the target D2D device 813 transmits, to the ProSe application server 817, a notification message including information indicating discovery of a new reference D2D device, for example, a reference D2D device carried by an emergency rescue team (step 831). The ProSe application server 817 may check the ID of the target D2D device 813, and indicate discovery of the target D2D device 813 to a predetermined contact, for example, a contact set when the target D2D device 813 has registered to the service, based on the check result.

Meanwhile, discovery response messages transmitted to the target D2D device 813 by the reference D2D devices may include an indicator which activates the D2D positioning function. This indicator related to the activation of the D2D positioning function has been described before with reference to FIG. 3, and thus will not be described in detail herein.

Meanwhile, the target D2D device 813, which has received the D2D positioning function activation command, transmits an SLSS/PSBCH signal/PSCCH signal/PSSCH signal in this order (step 833). Upon receipt of the SLSS from the target D2D device 813, the reference D2D devices synchronize with the target D2D device 813. Further, upon receipt of the PSBCH signal form the target D2D device 813, the reference D2D devices acquire a system parameter used for the target D2D device 813 to transmit the PSCCH signal and the PSSCH signal. The system parameter may include information about a bandwidth supported by the target D2D device 813.

The target D2D device 813, which has transmitted the SLSS/PSBCH signal, transmits information about the positions of time/frequency resources and a modulation order for transmission of the PSSCH signal, and the size of frequency resources to be used for transmission of the PSSCH signal by the PSCCH signal. Further, after transmitting the PSCCH signal, the target D2D device 813 transmits the PSSCH signal. Upon receipt of the PSSCH signal from the target D2D device 813, the reference D2D devices perform a measurement operation for positioning, based on a demodulation reference signal (DMRS) transmitted in the PSSCH signal, or a sounding reference signal (SRS) transmitted in the PSSCH signal. The measurement operation will be described below in detail.

The measurement operation may be an operation of measuring the received power of the DMRS or SRS or an operation of measuring the reception time of the DMRS or SRS. If the measurement operation is the operation of measuring the received power, the target D2D device 813 should transmit information about the transmission power of the target D2D device 813 in the PSSCH signal. If the measurement operation is the operation of measuring the reception time, the target D2D device 813 may follow a UTDoA protocol used in the current LTE communication system. For example, a plurality of reference D2D devices measure the reception time of the DMRS or SRS transmitted by the target D2D device 813, and transmit the measurement results to the ProSe application server 817 or a separate location server (step 835), and the ProSe application server 817 or the separate location server perform positioning based on the measurement results reported by the reference D2D devices.

The ProSe application server 817 or the separate location server may notify the reference D2D devices of the positioning results (step 837). Further, the ProSe application server 817 or the separate location server may notify a predetermined contact, for example, a police station, the 119 emergency services, or an emergency room of a hospital of information about the location of the target D2D device 813.

Meanwhile, the procedure for automatically activating an urgent D2D discovery operation and a D2D positioning operation, illustrated in FIG. 8 is obviously applicable to various scenarios as well as the scenarios described with reference to FIGS. 1 and 2, which will be described below in detail.

For example, a target D2D device which has entered a hospital is allocated a ProSe application code by a separate server interacting with a ProSe application server, for example, a separate server operable by the hospital, and periodically transmits a discovery request message. Upon receipt of the discovery request message, reference D2D devices transmit discovery response messages in response to the discovery request message.

The target D2D device recognizes that it has entered the hospital by the discovery response messages, and may notify the ProSe application server or the separate server of the entry into the hospital.

Meanwhile, the target D2D device transmits an SLSS/PSBCH signal/PSCCH signal/PSSCH signal, etc. so that the reference D2D devices installed in the hospital may measure the location of the target D2D device. Upon receipt of the SLSS/PSBCH signal/PSCCH signal/PSSCH signal, the reference D2D devices measure a signal from the target D2D device and notify the ProSe application server or the separate server of measurement results. The ProSe application server or the separate server may shorten a waiting time for which a user of the target D2D device waits to see a doctor or guide the user of the target D2D device to a doctor's office by acquiring recent medical records and reservations of the user of the target D2D device, based on the ID of the target D2D device.

In another example, reference D2D devices installed in a nursing home or the like are allocated a ProSe application code by the ProSe application server, and periodically transmit discovery request messages. Meanwhile, a target D2D device of a user who has agreed on providing of location information about the user, among users staying in the nursing home, periodically measures the location of the target D2D device, and reports the measurement result to the reference D2D devices or a ProSe application server, or a separate server interacting with the prose application server.

The location measurement result of the target D2D device may be reported periodically or only upon occurrence of a specific event. The specific event may be a movement pattern or motion pattern recorded by a motion sensor, which is different from a typical movement pattern or motion pattern. Further, the specific event may be a heart rate/blood pressure pattern recorded by a heart rate sensor/blood pressure sensor different from a typical heart rate/blood pressure pattern.

Meanwhile, although another exemplary procedure for automatically activating an urgent D2D discovery operation and a D2D positioning operation in a communication system supporting a D2D scheme according to an embodiment of the disclosure has been described above with reference to FIG. 8, various modifications may be made to FIG. 8. For example, while successive steps are illustrated in FIG. 8, the steps of FIG. 8 may overlap with each other, take place in parallel, be performed in a different order, or take place a plurality of times.

Another exemplary procedure for automatically activating an urgent D2D discovery operation and a D2D positioning operation in a communication system supporting a D2D scheme according to an embodiment of the disclosure has been described above with reference to FIG. 8. Now, a description will be given of an exemplary procedure for operating a reference D2D device in a communication system supporting a D2D scheme according to an embodiment of the disclosure, with reference to FIG. 9.

Figure 9:
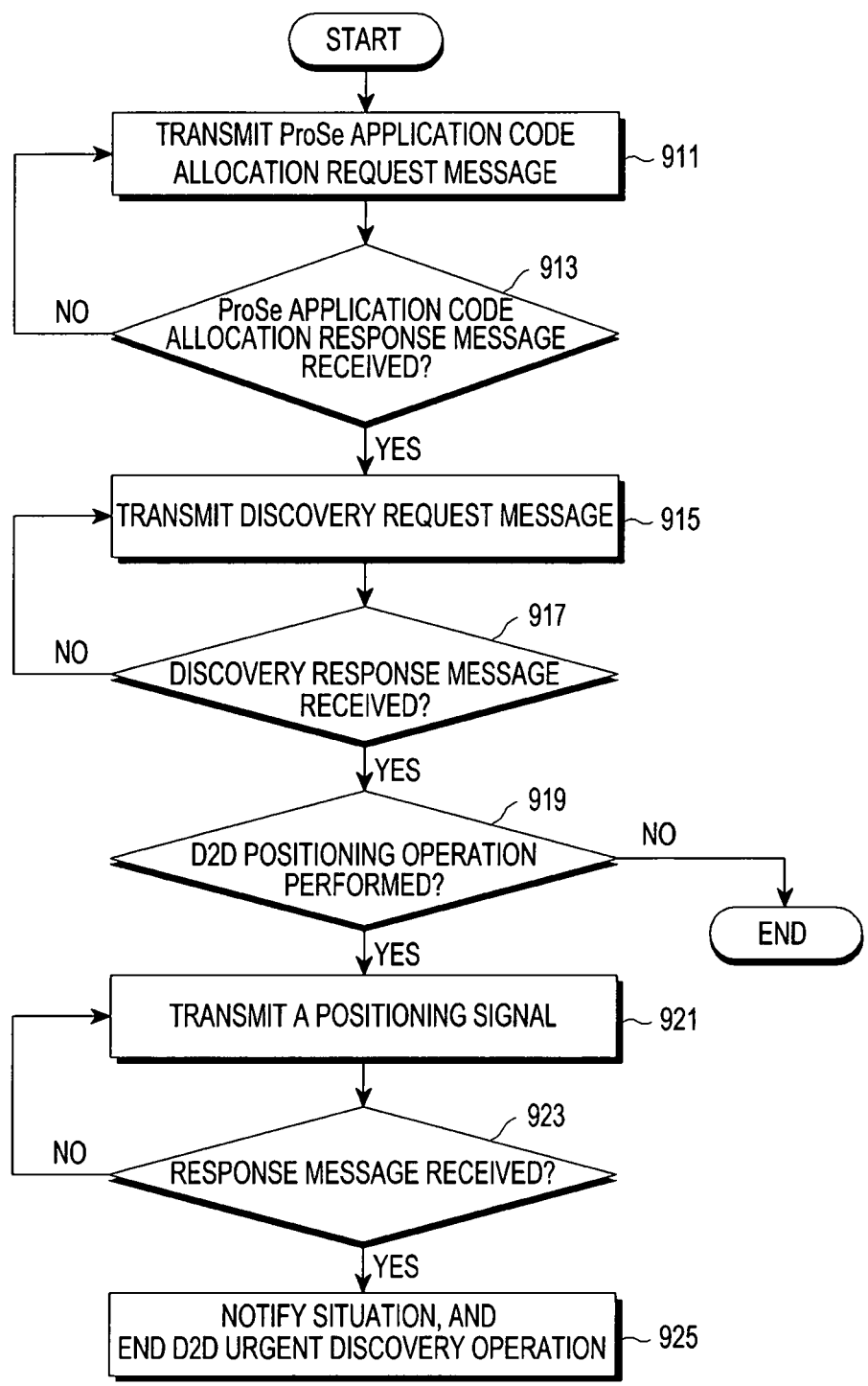
FIG. 9 is a schematic view illustrating an exemplary procedure for operating a reference D2D device in a communication system supporting a D2D scheme according to an embodiment of the disclosure.

FIG. 9 is a schematic view illustrating an exemplary procedure for operating a reference D2D device in a communication system supporting a D2D scheme according to an embodiment of the disclosure.

Referring to FIG. 9, it is to be noted that the procedure for operating a reference D2D device illustrated in FIG. 9 is for the case where the location of a target D2D device is detected based on urgently installed reference D2D devices.

In step 911, a reference D2D device, for example, a reference D2D device urgently installed in a target region transmits a ProSe application code allocation request message requesting allocation of a ProSe application code, for activation of an urgent discovery function and a positioning function, and proceeds to step 913. In step 913, the reference D2D device checks whether a ProSe application code allocation response message including a ProSe application code has been received. Upon receipt of the ProSe application code allocation response message, the reference D2D device goes to step 915.

The reference D2D device transmits a discovery request message including the ProSe application code in step 915 and proceeds to step 917. In step 917, the reference D2D device checks whether a discovery response message has been received from the target D2D device in response to the discovery request message. Upon receipt of the discovery response message from the target D2D device, the reference D2D device goes to step 919. The reference D2D device checks whether D2D positioning is required in step 919. If D2D positioning is not required, the reference D2D device discontinues the discovery operation. Meanwhile, while not shown in FIG. 9, if the reference D2D device fails to receive the discovery response message during a predetermined time from the target D2D device, the reference D2D device discontinues the transmission of the discovery request message, and also ends the urgent discovery operation.

Meanwhile, if D2D positioning is required in step 919, the reference D2D device proceeds to step 921. The reference D2D device transmits a positioning signal in step 921 and goes to step 923. In step 923, the reference D2D device checks whether a response message including a measurement result has been received from the target D2D device. Upon receipt of the response message including the positioning result from the target D2D device, the reference D2D device proceeds to step 925. The reference D2D device notifies the ProSe application server of the situation, that is, the measurement result and then ends the urgent discovery function and the D2D positioning function in step 925.

Meanwhile, if the reference D2D device has received the discovery response message but fails to receive a response to the transmitted positioning signal, that is, the discovery response message does not include a positioning result of the target D2D device, the reference D2D device continuously transmits the positioning signal during a predetermined time. However, if the reference D2D device fails to receive a positioning result of the target D2D device even after the predetermined time elapses, the reference D2D device notifies the corresponding situation and then ends the urgent discovery function.

In the situation described with reference to FIG. 9, the reference D2D device may estimate the location of the target D2D device by using the absolute coordinates (latitude, longitude, and altitude) of the reference D2D device, based on the received power of a DMRS included in the discovery response message received from the target D2D device. For this purpose, the reference D2D device may report the received power of the DMRS included in the discovery response message received from the target D2D device to the ProSe application server.

Meanwhile, while FIG. 9 illustrates an exemplary procedure for operating a reference D2D device in a communication system supporting a D2D scheme according to an embodiment of the disclosure, it is obvious that various modifications may be made to FIG. 9. For example, while successive steps are illustrated in FIG. 9, the steps of FIG. 9 may overlap with each other, take place in parallel, be performed in a different order, or take place a plurality of times.

An exemplary procedure for operating a reference D2D device in a communication system supporting a D2D scheme according to an embodiment of the disclosure has been described above with reference to FIG. 9. Now, a description will be given of another exemplary procedure for operating a reference D2D device in a communication system supporting a D2D scheme according to an embodiment of the disclosure with reference to FIG. 10.

Figure 10:
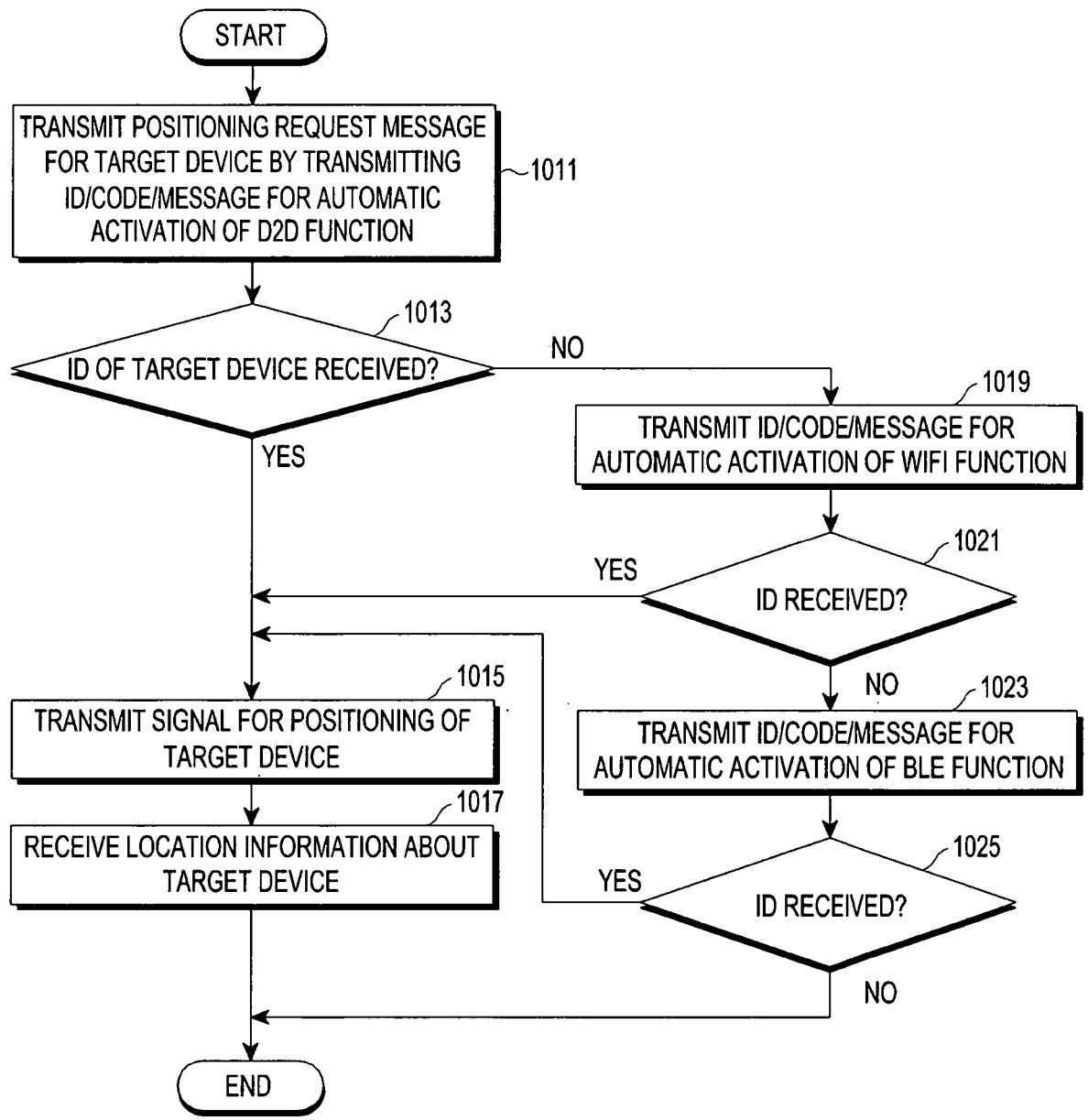
FIG. 10 is a schematic view illustrating another exemplary procedure for operating a reference D2D device in a communication system supporting a D2D scheme according to an embodiment of the disclosure.

FIG. 10 is a schematic view illustrating another exemplary procedure for operating a reference D2D device in a communication system supporting a D2D scheme according to an embodiment of the disclosure.

Referring to FIG. 10, it is to be noted that the procedure for operating a reference D2D device illustrated in FIG. 10 is for the case where the location of a target D2D device is detected based on urgently installed reference D2D devices.

In step 1011, a reference D2D device, for example, a reference D2D device urgently installed in a target region requests allocation of an ID/ProSe application code/discovery request message, for urgent discovery to a ProSe application server, for activation of an urgent discovery function and a positioning function, and proceeds to step 1013. In step 1013, the reference D2D device checks whether the ID of a target D2D device has been received from the ProSe application server. Upon receipt of the ID of the target D2D device from the ProSe application server, the reference D2D device goes to step 1015. The reference D2D device transmits a signal for positioning of the target D2D device in step 1015 and proceeds to step 1017. In step 1017, the signal for positioning of the target D2D device may be a DMRS or SRS included in a PSDCH signal being a discovery channel signal or a PSSCH being a data channel signal, or a separate positioning signal transmitted on a sidelink.

In step 1017, the reference D2D device receives location information about the target D2D device from the target D2D device. Herein, upon receipt of the location information about the target D2D device from the target D2D device, the reference D2D device may immediately end, or after receiving the location information about the target D2D device from the target D2D device, the reference D2D device may transmit an ACK signal to the target D2D device and then end, or after receiving the location information about the target D2D device from the target D2D device, the reference D2D device may transmit the location information about the target D2D device to the ProSe application server and then end.

Meanwhile, if the reference D2D device fails to receive the ID of the target D2D device in step 1013, the reference D2D device goes to step 1019. In step 1019, the reference D2D device transmits an ID/code/message for automatic activation of a WiFi positioning function, and then goes to step 1021. In step 1021, the reference D2D device checks whether the ID of the target D2D device has been received from the ProSe application server. Upon receipt of the ID of the target D2D device from the ProSe application server, the reference D2D device goes to step 1015.

Meanwhile, if the reference D2D device fails to receive the ID of the target D2D device in step 1021, the reference D2D device goes to step 1023. In step 1023, the reference D2D device transmits an ID/code/message for automatic activation of a Bluetooth low energy (BLE) function, and then goes to step 1025. In step 1025, the reference D2D device checks whether the ID of the target D2D device has been received from the ProSe application server. Upon receipt of the ID of the target D2D device from the ProSe application server, the reference D2D device goes to step 1015.

Meanwhile, while FIG. 10 illustrates another exemplary procedure for operating a reference D2D device in a communication system supporting a D2D scheme according to an embodiment of the disclosure, it is obvious that various modifications may be made to FIG. 10. For example, while successive steps are illustrated in FIG. 10, the steps of FIG. 10 may overlap with each other, take place in parallel, be performed in a different order, or take place a plurality of times.

Another exemplary procedure for operating a reference D2D device in a communication system supporting a D2D scheme according to an embodiment of the disclosure has been described above with reference to FIG. 10. Now, a description will be given of another exemplary procedure for operating a reference D2D device in a communication system supporting a D2D scheme according to an embodiment of the disclosure with reference to FIG. 11.

Figure 11:
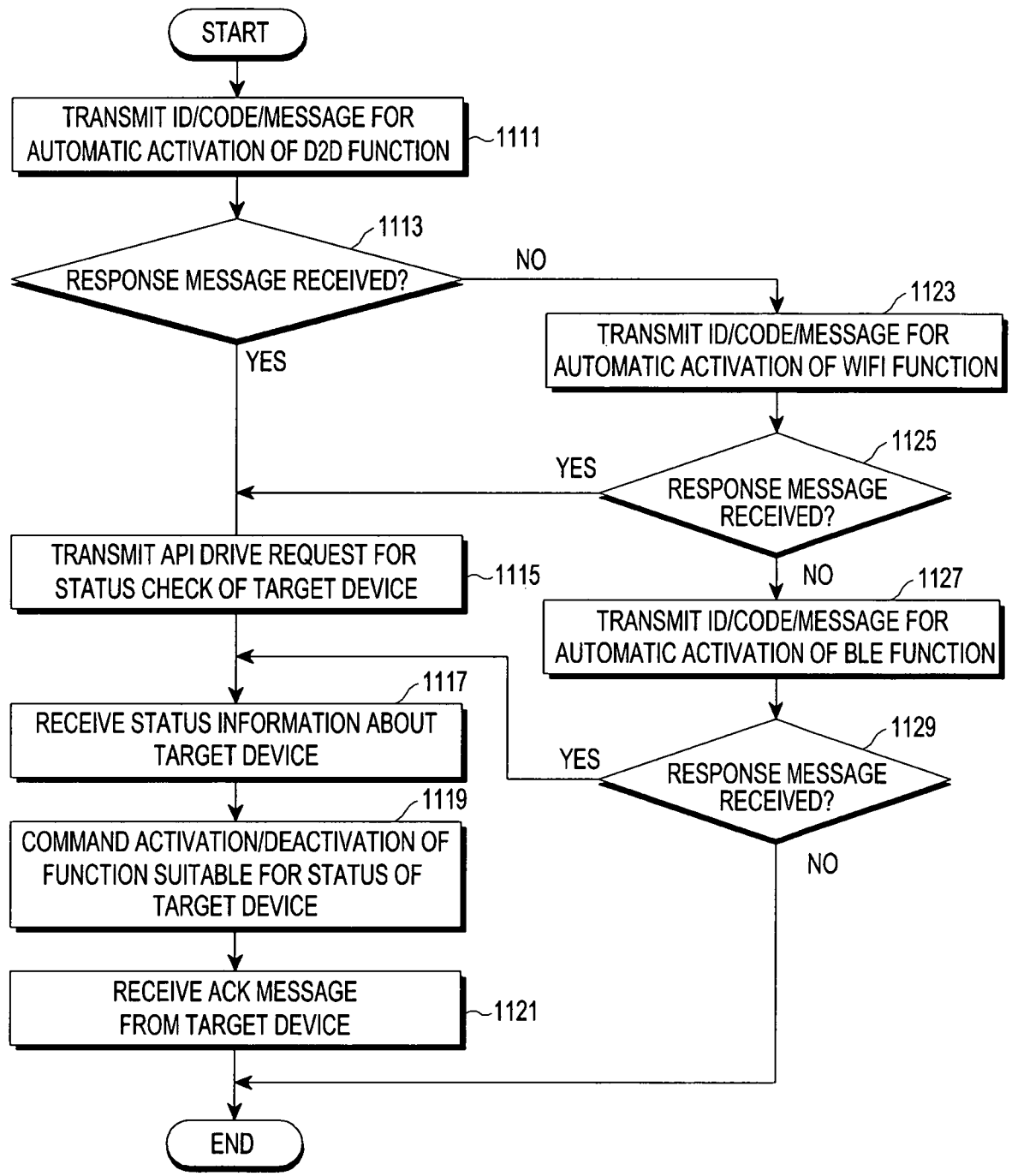
FIG. 11 is a schematic view illustrating another exemplary procedure for operating a reference D2D device in a communication system supporting a D2D scheme according to an embodiment of the disclosure.

FIG. 11 is a schematic view illustrating another exemplary procedure for operating a reference D2D device in a communication system supporting a D2D scheme according to an embodiment of the disclosure.

Referring to FIG. 11, it is to be noted that the operation procedure of a reference D2D device illustrated in FIG. 10 is for the case where the location of a target D2D device is detected based on urgently installed reference D2D devices.

Referring to FIG. 11, in step 1111, a reference D2D device, for example, a reference D2D device urgently installed in a target region requests allocation of a specific ID/ProSe application code/discovery message for activation or deactivation of a function of a D2D device carried by a user, that is, a target D2D device to a ProSe application server, and is allocated the specific ID/ProSe application code/discovery message by the ProSe application server. Then, the reference D2D device transmits an ID/code/message for automatic activation of a D2D function by a discovery request message and proceeds to step 1113.

In step 1113, the reference D2D device checks whether a discovery response message has been received from the target D2D device. If a response message is received, particularly the discovery response message is received from the target D2D device and the ID of the target D2D device is detected in the discovery response message, the reference D2D device goes to step 1115. In step 1115, the reference D2D device transmits an API drive request message to trigger check of the status of the target D2D device, and goes to step 1117.

The reference D2D device receives information indicating the status of the target D2D device from the target D2D device in step 1117 and proceeds to step 1119. The status of the target D2D device may include information about the remaining battery amount of the target D2D device, information indicating whether GPS-based/network-based positioning information is supported or not, information about a current accessible system such as LTE/WiFi/Bluetooth/WCDMA, and information about an impact degree, a blood pressure, and a heart rate. In contrast, the status check of the target D2D device may be triggered implicitly. For example, upon receipt of the automatic function activation ID/ProSe application code/discovery message, the target D2D device may be pre-configured to transmit its status by the discovery response message.

Meanwhile, upon receipt of the status information about the target D2D device from the target D2D device, the reference D2D device commands activation/deactivation of a function suitable for the status of the target D2D device and goes to step 1121. For example, if the remaining battery amount of the target D2D device is less than a threshold remaining battery amount, the reference D2D device may command an ultra power save mode such as termination of an unnecessary application, termination of an unnecessary communication mode, or a screen server function. On the other hand, if the remaining battery amount of the target D2D device is equal to or larger than the threshold remaining battery amount, the reference D2D device may command the target D2D device to activate, for example, a function that assists with rescue. For example, the reference D2D device may command the target D2D device to active a specific function such as the increase of the transmission power, (re)transmission number, and the number of accessible systems of the target D2D device.

In step 1121, the reference D2D device receives an ACK message for the function activation/deactivation command from the target D2D device.

Meanwhile, if the reference D2D device fails to receive the discovery response message from the target D2D device in step 1113, the reference D2D device proceeds to step 1123. The reference D2D device transmits an ID/code/message for automatic activation of a WiFi function, and then goes to step 1125. In step 1125, the reference D2D device checks whether the discovery response message has been received from the target D2D device. Upon receipt of the discovery response message from the target D2D device, the reference D2D device goes to step 1115.

Meanwhile, if the reference D2D device fails to receive the discovery response message from the target D2D device in step 1125, the reference D2D device goes to step 1127. In step 1127, the reference D2D device transmits an ID/code/message for automatic activation of a BLE function, and then goes to step 1129. In step 1129, the reference D2D device checks whether the discovery response message has been received from the target D2D device. Upon receipt of the discovery response message from the target D2D device, the reference D2D device goes to step 1115.

Meanwhile, a function of the target D2D device may be activated/deactivated according to an autonomous decision of the target D2D device, rather than by an explicit command from the reference D2D device. That is, upon receipt of an ID/code/message for urgent discovery, indicating urgent discovery from the reference D2D device, the target D2D device may measure and determine its status, and activate/deactivate its function. Meanwhile, while FIG. 11 illustrates another exemplary procedure for operating a reference D2D device in a communication system supporting a D2D scheme according to an embodiment of the disclosure, it is obvious that various modifications may be made to FIG. 11. For example, while successive steps are illustrated in FIG. 11, the steps of FIG. 11 may overlap with each other, take place in parallel, be performed in a different order, or take place a plurality of times.

Another exemplary procedure for operating a reference D2D device in a communication system supporting a D2D scheme according to an embodiment of the disclosure has been described above with reference to FIG. 11. Now, a description will be given of an exemplary procedure for operating a target D2D device in a communication system supporting a D2D scheme according to an embodiment of the disclosure with reference to FIG. 12.

Figure 12:
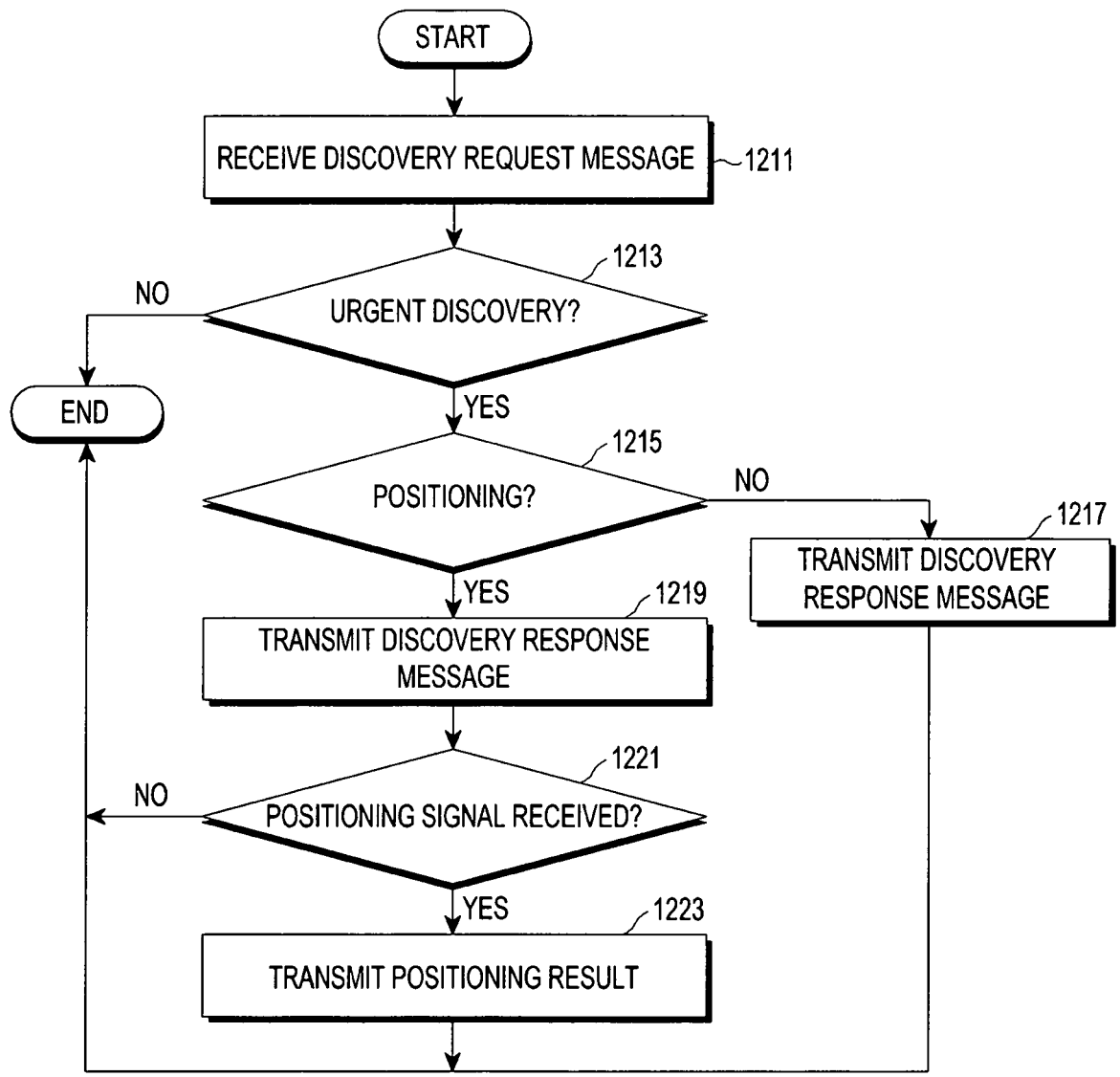
FIG. 12 is a schematic view illustrating an exemplary procedure for operating a target D2D device in a communication system supporting a D2D scheme according to an embodiment of the disclosure.

FIG. 12 is a schematic view illustrating an exemplary procedure for operating a target D2D device in a communication system supporting a D2D scheme according to an embodiment of the disclosure.

Referring to FIG. 12, it is to be noted that the procedure for operating a target D2D device illustrated in FIG. 12 is for the case where the location of a target D2D device is detected based on urgently installed reference D2D devices.

After a target D2D device receives a discovery request message in step 1211, the target D2D device proceeds to step 1213. In step 1213, the target D2D device checks whether urgent discovery is required. If urgent discovery is required, the target D2D device goes to step 1215. In step 1215, the target D2D device checks whether positioning is required. If positioning is not required, the target D2D device goes to step 1217. In step 1217, the target D2D device transmits a discovery response message to the received discovery request message and then switches to a power save mode.

Meanwhile, if positioning is required in step 1215, the target D2D device proceeds to step 1219. The target D2D device transmits a discovery response message in step 1219 and goes to step 1221. In step 1221, the target D2D device checks whether a positioning signal has been received. Upon receipt of the positioning signal, the target D2D device proceeds to step 1223. In step 1223, the target D2D device detects a positioning result based on the positioning signal and transmits the positioning result. Herein, after transmitting the positioning result, the target D2D device may switch to the power save mode immediately, or upon receipt of an ACK signal for the transmitted positioning result, the target D2D device may switch to the power save mode. The power save mode refers to a mode in which if the D2D device includes a display unit, like a smartphone or a smart watch, the brightness of the display unit is minimized or the display unit is off as is done by the screen saver function, in order to minimize power consumption of the D2D device. Further, if the D2D device does not include a display unit, the life time of the battery is maximized by turning off an unnecessary function.

Meanwhile, while FIG. 12 illustrates an exemplary procedure for operating a target D2D device in a communication system supporting a D2D scheme according to an embodiment of the disclosure, it is obvious that various modifications may be made to FIG. 12. For example, while successive steps are illustrated in FIG. 12, the steps of FIG. 12 may overlap with each other, take place in parallel, be performed in a different order, or take place a plurality of times.

An exemplary procedure for operating a target D2D device in a communication system supporting a D2D scheme according to an embodiment of the disclosure has been described above with reference to FIG. 12. Now, a description will be given of another exemplary procedure for operating a target D2D device in a communication system supporting a D2D scheme according to an embodiment of the disclosure with reference to FIG. 13.

Figure 13:
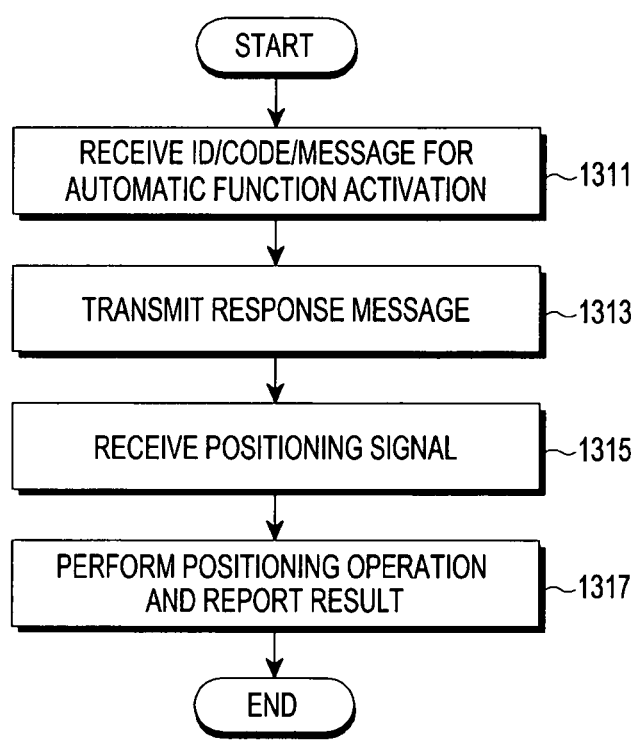
FIG. 13 is a schematic view illustrating another exemplary procedure for operating a target D2D device in a communication system supporting a D2D scheme according to an embodiment of the disclosure.

FIG. 13 is a schematic view illustrating another exemplary procedure for operating a target D2D device in a communication system supporting a D2D scheme according to an embodiment of the disclosure.

Referring to FIG. 13, it is to be noted that the procedure for operating a target D2D device illustrated in FIG. 13 is for the case where the location of a target D2D device is detected based on urgently installed reference D2D devices.

After a target D2D device receives an automatic function activation ID/code/message in step 1311, the target D2D device proceeds to step 1313. In step 1313, the target D2D device transmits a response message including its ID in response to the received automatic function activation ID/code/message and proceeds to step 1315. The target D2D device receives a positioning signal from a reference D2D device in step 1315 and goes to step 1317. In step 1317, the target D2D device performs a positioning operation based on the positioning signal, and reports a positioning result to the reference D2D device.

Meanwhile, while FIG. 13 illustrates another exemplary procedure for operating a target D2D device in a communication system supporting a D2D scheme according to an embodiment of the disclosure, it is obvious that various modifications may be made to FIG. 13. For example, while successive steps are illustrated in FIG. 13, the steps of FIG. 13 may overlap with each other, take place in parallel, be performed in a different order, or take place a plurality of times.

Another exemplary procedure for operating a target D2D device in a communication system supporting a D2D scheme according to an embodiment of the disclosure has been described above with reference to FIG. 13. Now, a description will be given of another exemplary procedure for operating a target D2D device in a communication system supporting a D2D scheme according to an embodiment of the disclosure with reference to FIG. 14.

Figure 14:
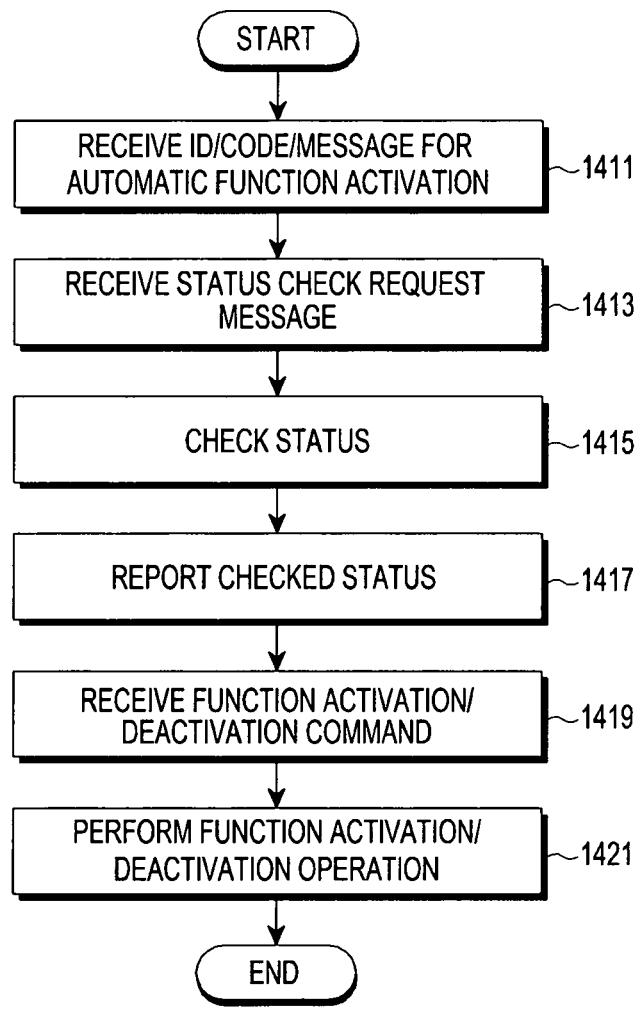
FIG. 14 is a schematic view illustrating another exemplary procedure for operating a target D2D device in a communication system supporting a D2D scheme according to an embodiment of the disclosure.

FIG. 14 is a schematic view illustrating another exemplary procedure for operating a target D2D device in a communication system supporting a D2D scheme according to an embodiment of the disclosure.

Referring to FIG. 14, it is to be noted that the procedure for operating a target D2D device illustrated in FIG. 14 is for the case where the location of a target D2D device is detected based on urgently installed reference D2D devices.

After a target D2D device receives an automatic function activation ID/code/message from a reference D2D device in step 1411, the target D2D device proceeds to step 1413. In step 1413, the target D2D device receives a status check request message and goes to step 1415. The target device performs a status check operation in step 1415 and goes to step 1417. While it has been described with reference to FIG. 14 that after receiving the status check request message, the target D2D device performs the status check operation, by way of example, it is obvious that even though the target D2D device receives only the automatic function activation ID/code/message and does not receive the status check request message, the target D2D device may perform the status check operation.

Meanwhile, the target D2D device checks its status and reports a status check result in step 1417 and proceeds to step 1419. The target D2D device receives a function activation/deactivation command from the reference D2D device in step 1419, and proceeds to step 1421. In step 1421, the target D2D device performs a function activation/deactivation operation in correspondence with the function activation/deactivation command.

Meanwhile, while FIG. 14 illustrates another exemplary procedure for operating a target D2D device in a communication system supporting a D2D scheme according to an embodiment of the disclosure, it is obvious that various modifications may be made to FIG. 14. For example, while successive steps are illustrated in FIG. 14, the steps of FIG. 14 may overlap with each other, take place in parallel, be performed in a different order, or take place a plurality of times.

Another exemplary procedure for operating a target D2D device in a communication system supporting a D2D scheme according to an embodiment of the disclosure has been described above with reference to FIG. 14. Now, a description will be given of the internal structure of a reference D2D device in a communication system supporting a D2D scheme according to an embodiment of the disclosure with reference to FIG. 15.

Figure 15:
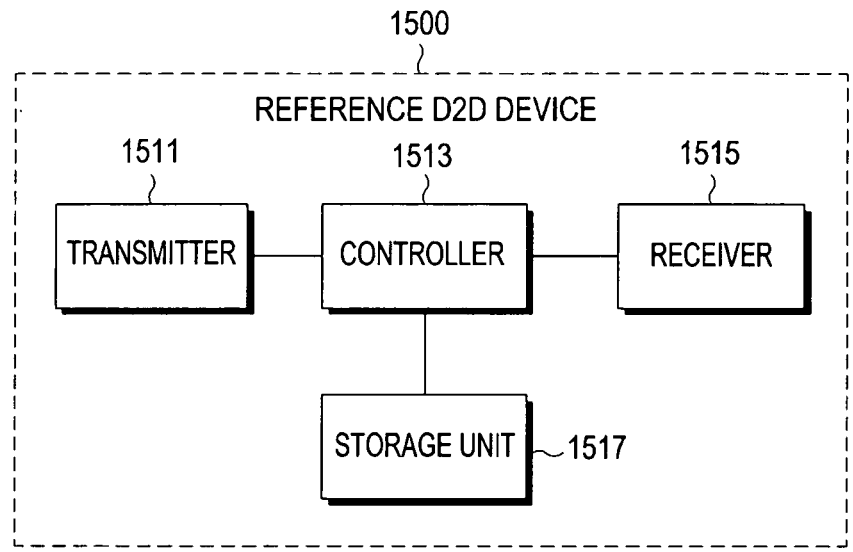
FIG. 15 is a schematic view illustrating the internal structure of a reference D2D device in a communication system supporting a D2D scheme according to an embodiment of the disclosure.

FIG. 15 is a schematic view illustrating the internal structure of a reference D2D device in a communication system supporting a D2D scheme according to an embodiment of the disclosure.

Referring to FIG. 15, a reference D2D device 1500 includes a transmitter 1511, a controller 1513, a receiver 1515, and a storage unit 1517.

The controller 1513 provides overall control to the reference D2D device 1500. Particularly, the controller 1513 controls operations related to an operation of automatically detecting a location, and an operation of automatically activating a positioning function in a communication system supporting a D2D scheme according to an embodiment of the disclosure. Particularly, the operations related to the operation of automatically detecting a location, and the operation of automatically activating a positioning function in the communication system supporting a D2D scheme according to the embodiment of the disclosure have been described with reference to FIGS. 1 to 14, and thus will not be described in detail herein.

The transmitter 1511 transmits various signals and various messages to other devices included in the communication system, for example, a target D2D device, a ProSe function entity, and a ProSe application server under the control of the controller 1513. Herein, the various signals and various messages transmitted by the transmitter 1511 have been described with reference to FIGS. 1 to 14, and thus will not be described in detail herein.

Further, the receiver 1515 receives various signals and various messages from other devices included in the communication system, for example, the target D2D device, the ProSe function entity, and the ProSe application server under the control of the controller 1513. Herein, the various signals and various messages received by the receiver 1515 have been described with reference to FIGS. 1 to 14, and thus will not be described in detail herein.

The storage unit 1517 stores programs and various data related to the operations related to the operation of automatically detecting a location, and the operation of automatically activating a positioning function in the communication system supporting a D2D scheme according to the embodiment of the disclosure, under the control of the controller 1513.

Further, the storage unit 1517 stores various signals and various messages received from the other devices by the receiver 1515.

Meanwhile, while the transmitter 1511, the controller 1513, the receiver 1515, and the storage unit 1517 are shown in FIG. 15 as separately configured in the reference D2D device 1500, it is obvious that at least two of the transmitter 1511, the controller 1513, the receiver 1515, and the storage unit 1517 may be combined in the reference D2D device 1500. Further, the reference D2D device 1500 may be configured as one processor.

With reference to FIG. 15, the internal structure of a reference D2D device in a communication supporting a D2D scheme according to an embodiment of the disclosure has been described above. Now, a description will be given of the internal structure of a target D2D device in a communication supporting a D2D scheme according to an embodiment of the disclosure with reference to FIG. 16.

Figure 16:
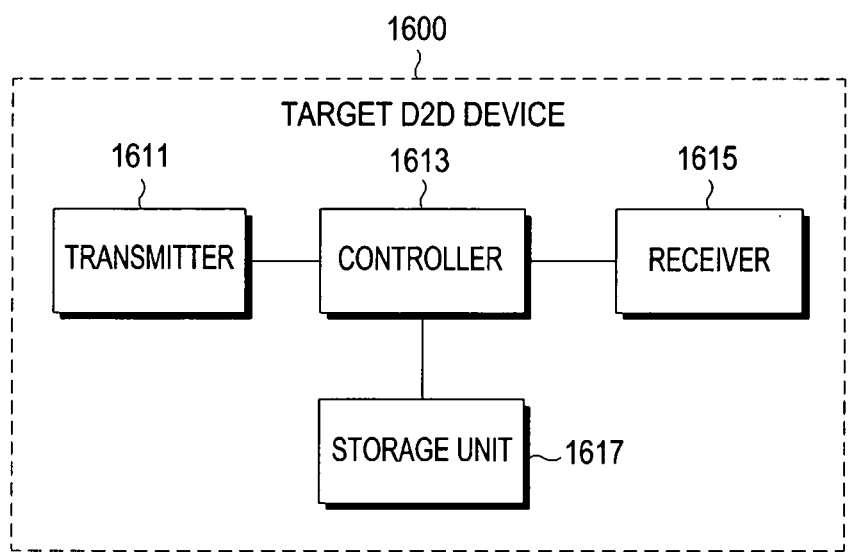
FIG. 16 is a schematic view illustrating the internal structure of a target D2D device in a communication system supporting a D2D scheme according to an embodiment of the disclosure.

FIG. 16 is a schematic view illustrating the internal structure of a target D2D device in a communication system supporting a D2D scheme according to an embodiment of the disclosure.

Referring to FIG. 16, a target D2D device 1600 includes a transmitter 1611, a controller 1613, a receiver 1615, and a storage unit 1617.

The controller 1613 provides overall control to the target D2D device 1600. Particularly, the controller 1613 controls operations related to an operation of automatically detecting a location, and an operation of automatically activating a positioning function in a communication system supporting a D2D scheme according to an embodiment of the disclosure. Particularly, the operations related to the operation of automatically detecting a location, and the operation of automatically activating a positioning function in the communication system supporting a D2D scheme according to the embodiment of the disclosure have been described with reference to FIGS. 1 to 14, and thus will not be described in detail herein.

The transmitter 1611 transmits various signals and various messages to other devices included in the communication system, for example, a reference D2D device, a ProSe function entity, and a ProSe application server under the control of the controller 1613. Herein, the various signals and various messages transmitted by the transmitter 1511 have been described with reference to FIGS. 1 to 14, and thus will not be described in detail herein.

Further, the receiver 1615 receives various signals and various messages from other devices included in the communication system, for example, the reference D2D device, the ProSe function entity, and the ProSe application server under the control of the controller 1613. Herein, the various signals and various messages received by the receiver 1615 have been described with reference to FIGS. 1 to 14, and thus will not be described in detail herein.

The storage unit 1617 stores programs and various data related to the operations related to the operation of automatically detecting a location, and the operation of automatically activating a positioning function in the communication system supporting a D2D scheme according to the embodiment of the disclosure, under the control of the controller 1613.

Further, the storage unit 1617 stores various signals and various messages received from the other devices by the receiver 1615.

Meanwhile, while the transmitter 1611, the controller 1613, the receiver 1615, and the storage unit 1617 are shown in FIG. 16 as separately configured in the target D2D device 1600, it is obvious that at least two of the transmitter 1611, the controller 1613, the receiver 1615, and the storage unit 1617 may be combined in the target D2D device 1600. Further, the target D2D device 1600 may be configured as one processor.

With reference to FIG. 16, the internal structure of a target D2D device in a communication supporting a D2D scheme according to an embodiment of the disclosure has been described above. Now, a description will be given of the internal structure of a ProSe function entity in a communication supporting a D2D scheme according to an embodiment of the disclosure with reference to FIG. 17.

Figure 17:
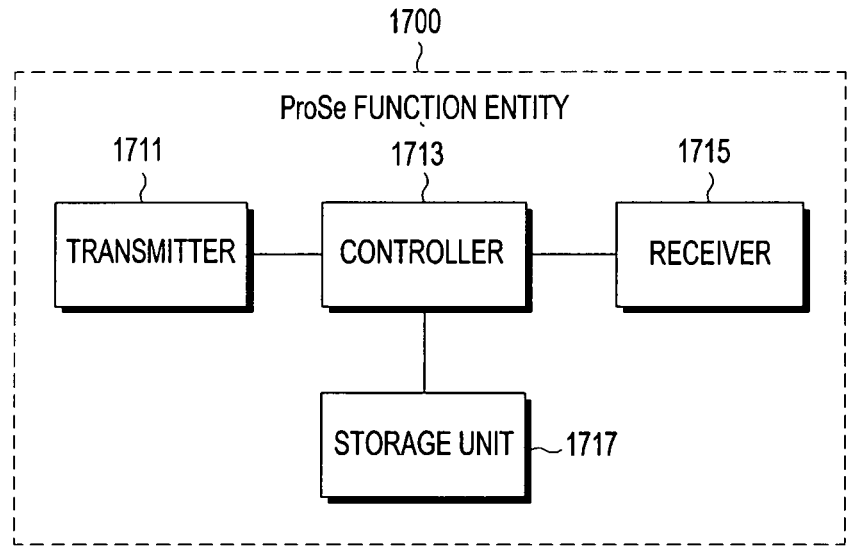
FIG. 17 is a schematic view illustrating the internal structure of a ProSe function entity in a communication system supporting a D2D scheme according to an embodiment of the disclosure.

FIG. 17 is a schematic view illustrating the internal structure of a ProSe function entity in a communication system supporting a D2D scheme according to an embodiment of the disclosure.

Referring to FIG. 17, a ProSe function entity 1700 includes a transmitter 1711, a controller 1713, a receiver 1715, and a storage unit 1717.

The controller 1713 provides overall control to the ProSe function entity 1700. Particularly, the controller 1713 controls operations related to an operation of automatically detecting a location, and an operation of automatically activating a positioning function in a communication system supporting a D2D scheme according to an embodiment of the disclosure. Particularly, the operations related to the operation of automatically detecting a location, and the operation of automatically activating a positioning function in the communication system supporting a D2D scheme according to the embodiment of the disclosure have been described with reference to FIGS. 1 to 14, and thus will not be described in detail herein.

The transmitter 1711 transmits various signals and various messages to other devices included in the communication system, for example, a reference D2D device, a target D2D device, and a ProSe application server under the control of the controller 1713. Herein, the various signals and various messages transmitted by the transmitter 1711 have been described with reference to FIGS. 1 to 14, and thus will not be described in detail herein.

Further, the receiver 1715 receives various signals and various messages from other devices included in the communication system, for example, the reference D2D device, the target D2D device, and the ProSe application server under the control of the controller 1713. Herein, the various signals and various messages received by the receiver 1715 have been described with reference to FIGS. 1 to 14, and thus will not be described in detail herein.

The storage unit 1717 stores programs and various data related to the operations related to the operation of automatically detecting a location, and the operation of automatically activating a positioning function in the communication system supporting a D2D scheme according to the embodiment of the disclosure, under the control of the controller 1713.

Further, the storage unit 1717 stores various signals and various messages received from the other devices by the receiver 1715.

Meanwhile, while the transmitter 1711, the controller 1713, the receiver 1715, and the storage unit 1717 are shown in FIG. 17 as separately configured in the ProSe function entity 1700, it is obvious that at least two of the transmitter 1711, the controller 1713, the receiver 1715, and the storage unit 1717 may be combined in the ProSe function entity 1700.

Further, the Prose function entity 1700 may be configured as one processor.

With reference to FIG. 17, the internal structure of a ProSe function entity in a communication supporting a D2D scheme according to an embodiment of the disclosure has been described above. Now, a description will be given of the internal structure of a ProSe application server in a communication supporting a D2D scheme according to an embodiment of the disclosure with reference to FIG. 18.

Figure 18:
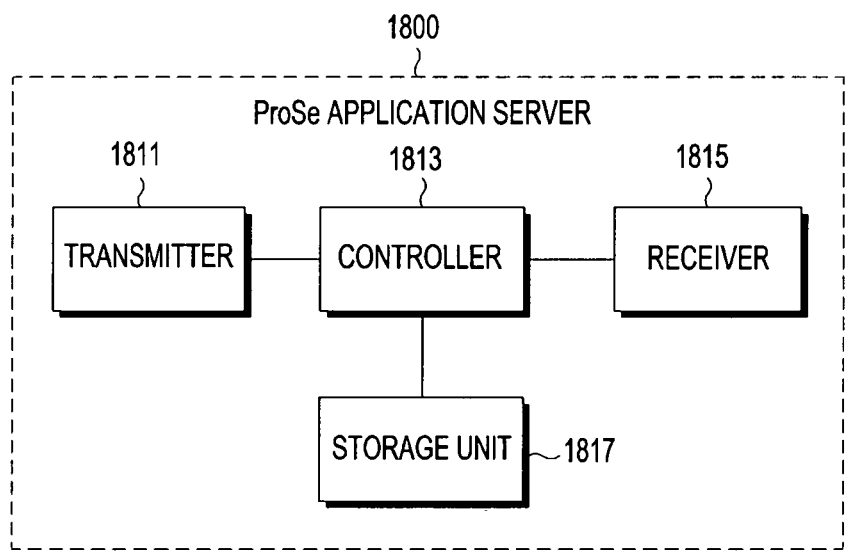
FIG. 18 is a schematic view illustrating the internal structure of a ProSe application server in a communication system supporting a D2D scheme according to an embodiment of the disclosure.

FIG. 18 is a schematic view illustrating the internal structure of a ProSe application server in a communication system supporting a D2D scheme according to an embodiment of the disclosure.

Referring to FIG. 18, a ProSe application server 1800 includes a transmitter 1811, a controller 1813, a receiver 1815, and a storage unit 1817.

The controller 1813 provides overall control to the ProSe application server 1800. Particularly, the controller 1813 controls operations related to an operation of automatically detecting a location, and an operation of automatically activating a positioning function in a communication system supporting a D2D scheme according to an embodiment of the disclosure. Particularly, the operations related to the operation of automatically detecting a location, and the operation of automatically activating a positioning function in the communication system supporting a D2D scheme according to the embodiment of the disclosure have been described with reference to FIGS. 1 to 14, and thus will not be described in detail herein.

The transmitter 1811 transmits various signals and various messages to other devices included in the communication system, for example, a reference D2D device, a target D2D device, and a ProSe function entity under the control of the controller 1813. Herein, the various signals and various messages transmitted by the transmitter 1811 have been described with reference to FIGS. 1 to 14, and thus will not be described in detail herein.

Further, the receiver 1815 receives various signals and various messages from other devices included in the communication system, for example, the reference D2D device, the target D2D device, and the ProSe function entity under the control of the controller 1813. Herein, the various signals and various messages received by the receiver 1815 have been described with reference to FIGS. 1 to 14, and thus will not be described in detail herein.

The storage unit 1817 stores programs and various data related to the operations related to the operation of automatically detecting a location, and the operation of automatically activating a positioning function in the communication system supporting a D2D scheme according to the embodiment of the disclosure, under the control of the controller 1813.

Further, the storage unit 1817 stores various signals and various messages received from the other devices by the receiver 1815.

Meanwhile, while the transmitter 1811, the controller 1813, the receiver 1815, and the storage unit 1817 are shown in FIG. 18 as separately configured in the ProSe application server 1800, it is obvious that at least two of the transmitter 1811, the controller 1813, the receiver 1815, and the storage unit 1817 may be combined in the ProSe application server 1800.

Further, the ProSe application server 1800 may be configured as one processor.

According to various embodiments of the disclosure, a method of a first device in a communication system supporting a D2D scheme is provided. The method of the first device includes: receiving a discovery request message including an application code for activating a positioning operation, and an ID of a corresponding device; determining the corresponding device to be a second device being a device about which location information needs to be detected, and transmitting a discovery response message including a predetermined specific ID; and receiving, from the second device, information related to performing of the positioning operation by the second device.

The method of the first device further includes detecting a measurement result based on the information related to performing of the positioning operation by the second device, and transmitting the measurement result to a server.

The method of the first device further includes receiving a measurement result for the second device from the server.

According to various embodiments of the disclosure, a method of a second device in a communication system supporting a D2D scheme is provided. The method of the second device includes: receiving, from a first device, a discovery request message requesting at least one of an urgent discovery operation or a positioning operation; transmitting a discovery response message to the discovery request message to the first device; and receiving information related to performing of the positioning operation from the first device. Herein, the second device is a device about which location information needs to be detected.

The method of the second device further includes transmitting information related to a location of the second device to the first device.

According to various embodiments of the disclosure, a method of a second device in a communication system supporting a D2D scheme is provided. The method of the second device includes: transmitting a discovery request message including an application code for activating a positioning operation, and an ID of a corresponding device; receiving a discovery response message including a predetermined specific ID from the first device; and transmitting, to the first device, information related to performing of the positioning operation by the second device. Herein, the second device is a device about which location information needs to be detected.

The method of the second device further includes transmitting, to a server, a notification message including information indicating the first device has been discovered.

Specific aspects of the disclosure may be implemented as a computer-readable code in a computer-readable recording medium. The computer-readable recoding medium is a data storage device capable of storing data readable by a computer system. Examples of the computer-readable recoding medium include read only memory (ROM), random access memory (RAM), compact disk read only memory (CD-ROM), magnetic tapes, floppy disks, optical data storage devices, and carrier waves (data transmission over the Internet). The computer-readable recoding medium may be distributed to networked computer systems, and thus the computer-readable code is stored and executed in a distributed manner. Further, skilled programmers in the art may easily interpret functional programs, code, and code segments constructed to achieve various embodiments of the present disclosure.

Further, the apparatus and method according to an embodiment of the disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as CD, DVD, a magnetic disk, or a magnetic tape. The method according to various embodiments of the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the embodiments of the present disclosure appropriately include the equivalents.

In addition, the apparatus according to an embodiment of the present disclosure may receive and store a program from a wiredly or wirelessly connected program providing device. The program providing device may include a program containing instructions that control a program processor to perform a predetermined content protection method, a memory for storing information required for the content protection method, a communication unit for conducting wired or wireless communication with a graphic processor, and a controller for transmitting the program to a transceiver upon request of the graphic processor or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method of a first device in a communication system supporting a device-to-device (D2D) scheme, the method comprising:
    transmitting a discovery request message requesting activation of at least one of an urgent discovery operation or a positioning operation upon detection of a presence of a second device of which location information needs to be detected;
    receiving, from at least one device including the second device, a discovery response message to the discovery request message; and
    transmitting, to the second device, information related to performing the positioning, operation.

2. The method of claim 1, further comprising:
    transmitting, to a server, a notification message including information indicating that the second device has been discovered.

3. The method of claim 1, further comprising:
    receiving, from the second device, information related to a location of the second device.

4. The method of claim 3, further comprising:
    transmitting, to a server, a notification message including the information related to the location of the second device.

5. A first device in a communication system supporting a device-to-device (D2D) scheme, the first device comprising:
    a controller configured to detect a presence of a second device of which location information needs to be detected;
    a transmitter configured to transmit a discovery request message requesting activation of at least one of an urgent discovery operation or a positioning operation; and
    a receiver configured to receive, from at least one device including the second device, a discovery response message to the discovery request message,
    wherein the transmitter is configured to transmit, to the second device, information related to performing of the positioning operation.

6. The first device of claim 5, wherein the transmitter is further configured to transmit, to a server, a notification message including information indicating that the second device has been discovered.

7. The first device of claim 5, wherein the receiver is further configured to receive, from the second device, information related to a location of the second device.

8. The first device of claim 7, wherein the transmitter is further configured to transmit, to a server, a notification message including the information related to the location of the second device.

9. A first device in a communication system supporting a device-to-device (D2D) scheme, the first device comprising:
    a receiver configured to receive a discovery request message including an application code for activating a positioning operation, and an identifier (ID) of a corresponding device;
    a controller configured to determine the corresponding device to be a second device of which location information needs to be detected; and
    a transmitter configured to transmit a discovery response message including a predetermined specific ID,
    wherein the receiver is further configured to receive, from the second device, information related to performing the positioning operation by the second device.

10. The first device of claim 9,
    wherein the controller is further configured to detect a measurement result based on the information related to performing the positioning operation by the second device, and
    wherein the transmitter is further configured to transmit the measurement result to a server.

11. The first device of claim 10, wherein the receiver is further configured to receive a positioning result for the second device from the server.

12. A second device in a communication system supporting a device-to-device (D2D) scheme, the second device comprising:
    a receiver configured to receive, from a first device, a discovery request message requesting activation of at least one of an urgent discovery operation or a positioning operation; and
    a transmitter configured to transmit, to the first device, a discovery response message to the discovery request message,
    wherein the receiver is further configured to receive, from the first device, information related to performing the positioning operation, and
    wherein the second device includes a device of which location information needs to be detected.

13. The second device of claim 12, wherein the transmitter is further configured to transmit, to the first device, information related to a location of the second device.

14. A second device in a communication system supporting a device-to-device (D2D) scheme, the second device comprising:
    a transmitter configured to transmit a discovery request message including an application code for activating a positioning operation, and an identifier (ID) of a corresponding device; and
    a receiver configured to receive a discovery response message including a predetermined specific ID from the first device,
    wherein the transmitter is further configured to transmit, to the first device, information related to performing the positioning operation by the second device, and
    wherein the second device includes a device of which location information needs to be detected.

15. The second device of claim 14, wherein the transmitter is further configured to transmit, to a server, a notification message including information indicating the first device has been discovered.

* * * * *